United States Patent
Bucknor et al.

(10) Patent No.: US 6,709,361 B1
(45) Date of Patent: Mar. 23, 2004

(54) FAMILY OF MULTI-SPEED TRANSMISSION MECHANISMS HAVING TWO INPUT CLUTCHES

(75) Inventors: Norman Kenneth Bucknor, Troy, MI (US); Madhusudan Raghavan, West Bloomfield, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/243,605

(22) Filed: Sep. 13, 2002

(51) Int. Cl.$^7$ .............................. F16H 3/44; F16H 3/62
(52) U.S. Cl. ...................................... 475/317; 475/275
(58) Field of Search ................................ 475/275, 317, 475/319

(56) References Cited

U.S. PATENT DOCUMENTS

| | | | |
|---|---|---|---|
| 4,070,927 A | 1/1978 | Polak | 74/765 |
| 4,334,440 A * | 6/1982 | Fonck | 475/330 |
| 4,709,594 A | 12/1987 | Maeda | 74/753 |
| 5,106,352 A | 4/1992 | Lepelletier | 475/280 |
| 5,226,862 A * | 7/1993 | Hattori | 475/286 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 2003/0060323 A1 * | 3/2003 | Kao et al. | 475/296 |
| 2003/0130083 A1 * | 7/2003 | Bucknor et al. | 475/317 |

FOREIGN PATENT DOCUMENTS

| | | | |
|---|---|---|---|
| EP | 1033510 | | 9/2000 |
| JP | 406288445 A | * | 10/1994 |
| JP | 9-126283 | | 5/1997 |

* cited by examiner

Primary Examiner—Roger Pang
(74) Attorney, Agent, or Firm—Kathryn A. Marra

(57) ABSTRACT

A family of power transmissions disposed in powertrains wherein each family member has three planetary gearsets and five selectively engageable torque-transmitting mechanisms. The torque-transmitting mechanisms are engaged in combinations of three to provide a reverse speed ratio and at least six forward speed ratios between an input shaft and an output shaft. The family members are characterized at least in part by interconnected members of the first and second planetary gearsets and continuously interconnected members of the second and third planetary gearsets. Further, the family members are characterized by the output shaft being continuously connected to one planetary gearset member, and the one member of the first planetary gearset being continuously connected with the transmission housing. One other common characteristic of the family members is that the input shaft is selectively connectible through at least two torque-transmitting mechanisms with members of at least two of the planetary gearsets.

9 Claims, 11 Drawing Sheets

| | RATIOS | 50 | 52 | 54 | 56 | 58 |
|---|---|---|---|---|---|---|
| REVERSE | -1.17 | X | | X | X | |
| NEUTRAL | 0 | | | X | X | |
| 1 | 2.30 | | X | X | X | |
| 2 | 1.45 | | X | X | | X |
| 3 | 1.00 | X | X | X | | |
| 4 | 0.70 | X | X | | X | |
| 5 | 0.47 | X | X | | | X |
| 6 | 0.35 | X | | | X | X |
| 7 | 0.25 | X | | X | | X |

( X=engaged )

Ring Gear/Sun Gear Tooth Ratios: $\frac{R1}{S1} = 1.86, \frac{R2}{S2} = 1.60, \frac{R3}{S3} = 1.67$

| Ratio Spread | 6.58 |
|---|---|
| Ratio Steps | |
| REV/1 | -0.51 |
| 1/2 | 1.59 |
| 2/3 | 1.45 |
| 3/4 | 1.43 |
| 4/5 | 1.50 |
| 5/6 | 1.33 |
| 6/7 | 1.39 |

| | RATIOS | 150 | 152 | 154 | 156 | 158 |
|---|---|---|---|---|---|---|
| REVERSE | -2.45 | X | X | X | | |
| NEUTRAL | 0 | | X | X | | |
| 1 | 3.67 | | X | X | | X |
| 2 | 1.89 | | X | X | X | |
| 3 | 1.00 | | X | | X | X |
| 4 | 0.76 | X | X | | X | |
| 5 | 0.60 | X | | | X | X |
| 6 | 0.53 | X | X | | | X |

( X=engaged )

Ring Gear/Sun Gear Tooth Ratios: $\frac{R1}{S1} = 1.50, \frac{R2}{S2} = 3.00, \frac{R3}{S3} = 1.59$

| Ratio Spread | 6.93 |
|---|---|
| Ratio Steps | |
| REV/1 | -0.67 |
| 1/2 | 1.94 |
| 2/3 | 1.89 |
| 3/4 | 1.31 |
| 4/5 | 1.27 |
| 5/6 | 1.13 |

| | RATIOS | 250 | 252 | 254 | 256 | 258 |
|---|---|---|---|---|---|---|
| REVERSE | -2.45 | X | X | X | | |
| NEUTRAL | 0 | | X | X | | |
| 1 | 3.67 | | X | X | | X |
| 2 | 1.89 | | X | X | X | |
| 3 | 1.00 | | X | | X | X |
| 4 | 0.76 | X | X | | X | |
| 5 | 0.60 | X | | | X | X |
| 6 | 0.53 | X | X | | | X |

(X=engaged)

Ring Gear/Sun Gear Tooth Ratios: $\frac{R1}{S1} = 1.50, \frac{R2}{S2} = 3.00, \frac{R3}{S3} = 1.59$

| Ratio Spread | 6.93 |
|---|---|
| Ratio Steps | |
| REV/1 | -0.67 |
| 1/2 | 1.94 |
| 2/3 | 1.89 |
| 3/4 | 1.31 |
| 4/5 | 1.27 |
| 5/6 | 1.13 |

| | RATIOS | 350 | 352 | 354 | 356 | 358 |
|---|---|---|---|---|---|---|
| REVERSE | -4.02 | X | X | | X | |
| NEUTRAL | 0 | | X | | X | |
| 1 | 4.33 | | X | | X | X |
| 2 | 2.67 | | X | X | X | |
| 3 | 1.56 | | X | X | | X |
| 4 | 1.00 | X | X | X | | |
| 5 | 0.67 | X | | X | | X |
| 6 | 0.54 | X | X | | | X |

( X = engaged )

Ring Gear/Sun Gear Tooth Ratios: $\frac{R1}{S1} = 1.50, \frac{R2}{S2} = 3.00, \frac{R3}{S3} = 1.67$

| Ratio Spread | 7.94 |
|---|---|
| Ratio Steps | |
| REV/1 | -0.93 |
| 1/2 | 1.62 |
| 2/3 | 1.71 |
| 3/4 | 1.56 |
| 4/5 | 1.50 |
| 5/6 | 1.22 |

| | RATIOS | 458 | 450 | 452 | 454 | 456 |
|---|---|---|---|---|---|---|
| REVERSE | -2.08 | X | X | | | X |
| NEUTRAL | 0 | | X | | | X |
| 1 | 2.76 | | X | | X | X |
| 2 | 1.57 | | | X | X | X |
| 3 | 1.00 | | X | X | | X |
| 4 | 0.68 | | X | X | X | |
| 5 | 0.48 | X | X | X | | |
| 6 | 0.39 | X | | X | X | |

(X=engaged)

Ring Gear/Sun Gear Tooth Ratios: $\frac{R1}{S1} = 2.33, \frac{R2}{S2} = 2.30, \frac{R3}{S3} = 1.59$

| Ratio Spread | 7.12 |
|---|---|
| Ratio Steps | |
| REV/1 | -0.76 |
| 1/2 | 1.76 |
| 2/3 | 1.57 |
| 3/4 | 1.48 |
| 4/5 | 1.43 |
| 5/6 | 1.23 |

| | RATIOS | 558 | 550 | 552 | 554 | 556 |
|---|---|---|---|---|---|---|
| REVERSE | -2.08 | X | X | | | X |
| NEUTRAL | 0 | | X | | | |
| 1 | 2.45 | | X | | X | X |
| 2 | 1.47 | | | X | X | X |
| 3 | 1.00 | | X | X | | X |
| 4 | 0.69 | | X | X | X | |
| 5 | 0.48 | X | X | X | | |
| 6 | 0.39 | X | | X | X | |

(X=engaged)

Ring Gear/Sun Gear Tooth Ratios: $\frac{R1}{S1} = 1.50, \frac{R2}{S2} = 2.30, \frac{R3}{S3} = 1.58$

| Ratio Spread | 6.34 |
|---|---|
| Ratio Steps | |
| REV/1 | -0.85 |
| 1/2 | 1.67 |
| 2/3 | 1.47 |
| 3/4 | 1.44 |
| 4/5 | 1.46 |
| 5/6 | 1.23 |

| | RATIOS | 658 | 650 | 652 | 654 | 656 |
|---|---|---|---|---|---|---|
| REVERSE | -1.82 | X | X | | | X |
| NEUTRAL | 0 | | X | | | X |
| 1 | 2.51 | | X | | X | X |
| 2 | 1.53 | | | X | X | X |
| 3 | 1.00 | | X | X | | X |
| 4 | 0.71 | | X | X | X | |
| 5 | 0.49 | X | X | X | | |
| 6 | 0.39 | X | | X | X | |

( X=engaged )

Ring Gear/Sun Gear Tooth Ratios: $\frac{R1}{S1} = 1.57, \frac{R2}{S2} = 1.88, \frac{R3}{S3} = 1.58$

| Ratio Spread | 6.49 |
|---|---|
| Ratio Steps | |
| REV/1 | -0.72 |
| 1/2 | 1.64 |
| 2/3 | 1.54 |
| 3/4 | 1.40 |
| 4/5 | 1.45 |
| 5/6 | 1.27 |

| | RATIOS | 750 | 752 | 754 | 756 | 758 |
|---|---|---|---|---|---|---|
| REVERSE | -2.02 | X | | X | | X |
| NEUTRAL | 0 | X | | | | X |
| 1 | 2.38 | X | | | X | X |
| 2 | 1.46 | | X | | X | X |
| 3 | 1.00 | X | X | | | X |
| 4 | 0.69 | X | X | | X | |
| 5 | 0.46 | X | X | X | | |
| 6 | 0.37 | | X | X | X | |

(X=engaged)

Ring Gear/Sun Gear Tooth Ratios: $\frac{R1}{S1} = 1.57, \frac{R2}{S2} = 2.37, \frac{R3}{S3} = 1.67$

| Ratio Spread | 6.36 |
|---|---|
| Ratio Steps | |
| REV/1 | -0.85 |
| 1/2 | 1.64 |
| 2/3 | 1.46 |
| 3/4 | 1.46 |
| 4/5 | 1.49 |
| 5/6 | 1.23 |

| | RATIOS | 850 | 852 | 854 | 856 | 858 |
|---|---|---|---|---|---|---|
| REVERSE | -1.82 | X | | X | | X |
| NEUTRAL | 0 | X | | | | X |
| 1 | 2.51 | X | | | X | X |
| 2 | 1.54 | | X | | X | X |
| 3 | 1.00 | X | X | | | X |
| 4 | 0.71 | X | X | | X | |
| 5 | 0.49 | X | X | X | | |
| 6 | 0.39 | | X | X | X | |

(X=engaged)

Ring Gear/Sun Gear Tooth Ratios: $\frac{R1}{S1} = 2.57, \frac{R2}{S2} = 1.88, \frac{R3}{S3} = 1.58$

| Ratio Spread | 6.49 |
|---|---|
| Ratio Steps | |
| REV/1 | -0.72 |
| 1/2 | 1.64 |
| 2/3 | 1.54 |
| 3/4 | 1.40 |
| 4/5 | 1.45 |
| 5/6 | 1.27 |

| | RATIOS | 950 | 952 | 954 | 956 | 958 |
|---|---|---|---|---|---|---|
| REVERSE | -1.17 | X | | X | X | |
| NEUTRAL | 0 | | | X | X | |
| 1 | 2.30 | | X | X | X | |
| 2 | 1.45 | | X | X | | X |
| 3 | 1.00 | X | X | X | | |
| 4 | 0.70 | X | X | | X | |
| 5 | 0.47 | X | X | | | X |
| 6 | 0.35 | X | | | X | X |
| 7 | 0.25 | X | | X | | X |

(X=engaged)

Ring Gear/Sun Gear Tooth Ratios: $\frac{R1}{S1} = 1.86, \frac{R2}{S2} = 2.60, \frac{R3}{S3} = 1.67$

| Ratio Spread | 6.58 |
|---|---|
| Ratio Steps | |
| REV/1 | -0.51 |
| 1/2 | 1.59 |
| 2/3 | 1.45 |
| 3/4 | 1.43 |
| 4/5 | 1.50 |
| 5/6 | 1.33 |
| 6/7 | 1.39 |

| | RATIOS | 1058 | 1050 | 1052 | 1054 | 1056 |
|---|---|---|---|---|---|---|
| REVERSE | -1.31 | X | X | | | X |
| NEUTRAL | 0 | | X | | | X |
| 1 | 1.64 | | X | | X | X |
| 2 | 1.00 | | | X | X | X |
| 3 | 0.67 | | X | X | | X |
| 4 | 0.48 | | X | X | X | |
| 5 | 0.33 | X | X | X | | |
| 6 | 0.27 | X | | X | X | |

( X=engaged )

Ring Gear/Sun Gear Tooth Ratios: $\frac{R1}{S1} = 1.56, \frac{R2}{S2} = 2.00, \frac{R3}{S3} = 2.50$

| Ratio Spread | 6.13 |
|---|---|
| Ratio Steps | |
| REV/1 | -0.80 |
| 1/2 | 1.64 |
| 2/3 | 1.48 |
| 3/4 | 1.39 |
| 4/5 | 1.44 |
| 5/6 | 1.25 |

FAMILY OF MULTI-SPEED TRANSMISSION MECHANISMS HAVING TWO INPUT CLUTCHES

TECHNICAL FIELD

This invention relates to multi-speed transmissions and, more particularly, to families of such transmission mechanisms having three planetary gearsets and five torque-transmitting mechanisms for establishing at least six forward speed ratios and one reverse speed ratio between an input shaft and an output shaft wherein each family member includes at least two input clutches.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; U.S. Pat. No. 5,599,251 issued to Beim and McCarrick on Feb. 4, 1997, U.S. Pat. No. 6,083,135 issued to Baldwin et al. on Jul. 4, 2000, and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide an improved family of low-content six-speed planetary transmissions.

In one aspect of the present invention, each family member includes three planetary gearsets and five selectively engageable torque-transmitting mechanisms.

In another aspect of the present invention, each of the planetary gearsets has three members comprised of a sun gear member, a ring gear member, and a planet carrier assembly member.

In yet another aspect of the present invention, the planet carrier assembly member can be of either the single pinion or double pinion type.

In still another aspect of the present invention, each family member has a first interconnecting member which continuously connects a first member of the first planetary gearset with a first member of the second planetary gearset; a second fixed interconnecting member that continuously interconnects a second member of the second planetary gearset with a first member of the third planetary gearset; and second member of the first planetary gearset is continuously interconnected with a stationary transmission housing.

In yet still another aspect of the present invention, the transmission output shaft is continuously connected with at least one member of one of the planetary gearsets.

In a further aspect of the present invention, the input shaft is selectively connectible with members of the planetary gearsets through at least two of the selectively engageable torque-transmitting mechanisms.

In a yet further aspect of the present invention, another of the torque-transmitting mechanisms selectively interconnects a member of the first planetary gearset with a member of the second or third planetary gearset.

In still a further aspect of the present invention, a fourth of the torque-transmitting mechanisms selectively interconnects a member of the third planetary gearset with a member of either the first or second planetary gearset.

In a yet still further aspect of the present invention, a fifth of the torque-transmitting mechanisms selectively interconnects a member of one of the planetary gearsets with either the output shaft or another member of one of the planetary gearsets, or to a stationary member of the planetary transmission.

In a yet further aspect of the present invention, the five selectively engageable torque-transmitting mechanisms are engaged in combinations of three to produce at least six forward speed ratios and one reverse speed ratio between the transmission input shaft and the transmission output shaft.

DESCRIPTION OF THE EXEMPLARY EMBODIMENT

Figures 1, 2:
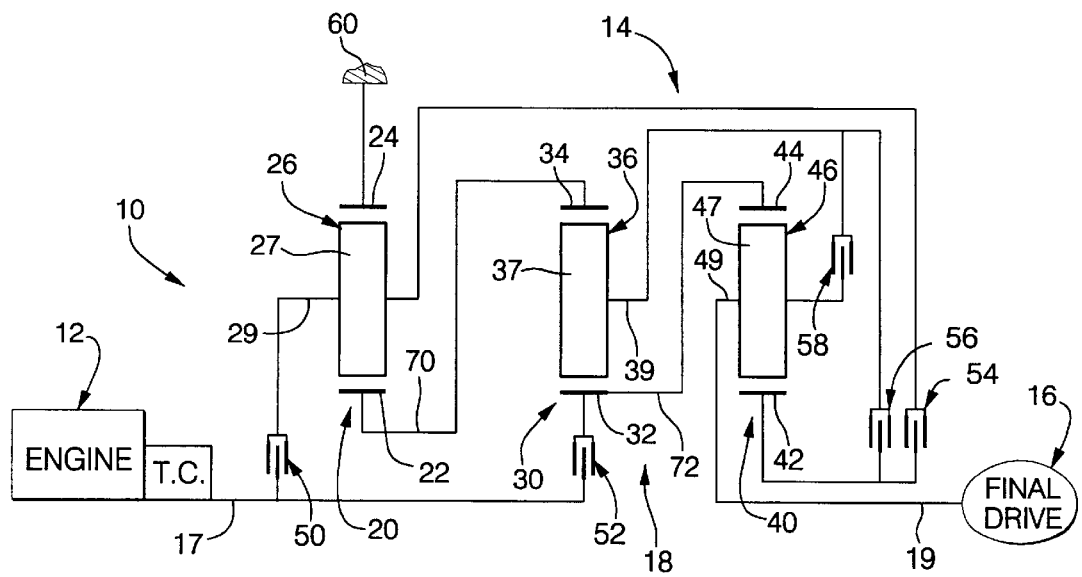
FIG. 1 is a schematic representation of a powertrain including one embodiment of the family of transmissions incorporating the present invention.
FIG. 2 is a truth table and chart describing some of the operating characteristics of the family member shown in FIG. 1.

Referring to the drawings, wherein like characters represent the same or corresponding parts throughout the several views, there is seen in FIG. 1 a powertrain 10 including a conventional engine and torque converter 12, a planetary transmission 14, and a final drive mechanism 16. The planetary transmission 14 includes an input shaft 17, a planetary gear arrangement 18, and an output shaft 19. The input shaft 17 is continuously connected with the engine and torque converter 12, and the output shaft 19 is continuously connected with the final drive mechanism 16. The planetary gear arrangement 18 includes three planetary gearsets 20, 30, and 40, and five torque-transmitting mechanisms 50, 52, 54, 56, and 58. The five torque-transmitting mechanisms are all selectively engageable fluid-operated type mechanisms and, in FIG. 1, each is a rotating type torque-transmitting mechanism, otherwise known as a clutch.

The planetary gearset 20 includes a sun gear member 22, a ring gear member 24, and a planet carrier assembly member 26. The planet carrier assembly member 26 includes a plurality of pinion gears 27 rotatably mounted on a planet carrier 29 and disposed in meshing relationship with both the sun gear member 22 and the ring gear member 24.

The planetary gearset 30 includes a sun gear member 32, a ring gear member 34, a planet carrier assembly member 36 which has a plurality of pinion gears 37 rotatably mounted on a planet carrier 39 and disposed in meshing relationship with the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a planet carrier 49 and disposed in meshing relationship with both the sun gear member 42 and the ring gear member 44.

The ring gear member 24 is continuously connected with a transmission housing 60. The sun gear member 22 and ring gear member 34 are continuously interconnected through an interconnecting member 70. The sun gear member 32 and ring gear member 44 are continuously interconnected by an interconnecting member 72. The planet carrier assembly member 46 is continuously connected with the output shaft 19. The input shaft 17 is selectively connectible with the planet carrier assembly member 26 through the torque-transmitting mechanism 50, and selectively connectible with the sun gear member 32 and ring gear member 44 through the torque-transmitting mechanism 52. The planet carrier assembly member 26 and the sun gear member 42 are selectively interconnectible through the torque-transmitting mechanism 54. The planet carrier assembly member 36 is selectively connectible with the sun gear member 42 through the torque-transmitting mechanism 56, and selectively connectible with the planet carrier assembly member 46 and therefore output shaft 19 through the torque-transmitting mechanism 58.

As can be seen in FIG. 1, the planet carrier assembly member 26, the planet carrier assembly member 36, and the sun gear member 42 are not continuously interconnected with other gear members or interconnecting members of the planetary gear arrangement 18. These noncontinuously connected members are selectively connectible with either the input shaft 17, the output shaft 19, or another member of the planetary gearset through the selectively engageable torque-transmitting mechanisms.

As seen in the truth table of FIG. 2, the torque-transmitting mechanisms 50, 52, 54, 56, and 58 are selectively engaged in combinations of three to establish the reverse speed ratio and six forward speed ratios between the input shaft 17 and the output shaft 19. Since the input shaft 17 is noncontinuously interconnected with the planetary gear arrangement 18, one or both of the torque-transmitting mechanisms 50 and 52 must be engaged to provide a power connection between the engine and torque converter 12 and the planetary gear arrangement 18. With neither of these torque-transmitting mechanisms engaged, the transmission is in a neutral condition.

To establish the reverse speed ratio, the torque-transmitting mechanisms 50, 54, and 56 are engaged. During the reverse speed ratio, the planet carrier assembly member 26, the sun gear member 42, and the planet carrier assembly member 36 are selectively connected with the input shaft 17. The sun gear member 22 and the ring gear member 34 are driven at a speed determined by the speed of the planet carrier assembly member 26 and the ring gear/sun gear tooth ratio of the planetary gearset 20. The sun gear member 32 and ring gear member 44 are driven at a speed determined by the speed of the ring gear member 34, the speed of the planet carrier assembly member 36, and the ring gear/sun gear tooth ratio of the planetary gearset 30. The planet carrier assembly member 46 and therefore the output shaft 19 are driven at a speed determined by the speed of the ring gear member 44, the speed of the sun gear member 42, and the ring gear/sun gear tooth ratio of the planetary gearset 40. The numerical value of the reverse speed ratio is determined by the ring gear/sun gear tooth ratios of all three planetary gearsets 20, 30, and 40.

The first forward speed ratio is established with the engagement of the torque-transmitting mechanisms 52, 54, and 56. It should be noted that the torque-transmitting mechanisms 54 and 56 can remain engaged through a neutral condition thereby simplifying the forward/reverse interchange. During the first forward speed ratio, the input shaft 17 is selectively connected with both the sun gear member 32 and the ring gear member 44. During the first forward speed ratio, the ring gear member 34 and therefore sun gear member 22 are driven at a speed determined by the speed of the sun gear member 32, the speed of the planet carrier assembly member 36, and the ring gear/sun gear tooth ratio of the planetary gearset 30. The planet carrier assembly member 26, sun gear member 42, and planet carrier assembly member 36 are driven at a speed determined by the speed of the sun gear member 22 and the ring gear/sun gear tooth ratio of the planetary gearset 20. The planet carrier assembly member 46 and therefore output shaft 19 are driven at a speed determined by the speed of the ring gear member 44, the speed of the sun gear member 42, and the ring gear/sun gear tooth ratio of the planetary gearset 40. The numerical value of the first forward speed ratio is determined by the ring gear/sun gear tooth ratios of all three planetary gearsets 20, 30, and 40.

The second forward speed ratio is established with the engagement of the torque-transmitting mechanisms 52, 54, and 58. During the second forward speed ratio, the ring gear member 34 and sun gear member 22 are driven at a speed determined by the speed of the sun gear member 32, the speed of the planet carrier assembly member 36, and the ring gear/sun gear tooth ratio of the planetary gearset 30. The planet carrier assembly member 36 and sun gear member 42 are driven at a speed determined by the speed of the sun gear member 22 and the ring gear/sun gear tooth ratio of the planetary gearset 20. The planet carrier assembly member 46 and therefore output shaft 19 are driven at a speed determined by the speed of the ring gear member 44, the speed of the sun gear member 42, and the ring gear/sun gear tooth ratio of the planetary gearset 40. The numerical value of the second forward speed ratio is determined by the ring gear/sun gear tooth ratios of all three planetary gearsets 20, 30, and 40.

The third forward speed ratio is established with the engagement of the torque-transmitting mechanisms 50, 52, and 54. With this combination of engagements, the sun gear member 42 and ring gear member 44 are both driven by the input shaft 17, therefore the output shaft 19 and planet carrier assembly member 46 also rotate at the speed of the input shaft 17. The numerical value of the third forward speed ratio is one.

The fourth forward speed ratio is established with the engagement of the torque-transmitting mechanisms 50, 52, and 56. During the fourth forward speed ratio, the planet carrier assembly member 26, sun gear member 32, and ring gear member 44, are all rotated in unison with the input shaft 17. The sun gear member 22 and ring gear member 34 are driven at a speed determined by the speed of the planet carrier assembly member 26 and the ring gear/sun gear tooth ratio of the planetary gearset 20. The planet carrier assembly member 36 and sun gear member 42 are driven at a speed determined by the speed of the sun gear member 32, the speed of the ring gear member 34, and the ring gear/sun gear tooth ratio of the planetary gearset 30. The planet carrier assembly member 46 and therefore output shaft 19 are driven at a speed determined by the speed of the ring gear member 44, the speed of the sun gear member 42, and the ring gear/sun gear tooth ratio of the planetary gearset 40. The numerical value of the fourth forward speed ratio is determined by the ring gear/sun gear tooth ratios of all three planetary gearsets 20, 30, and 40.

The fifth forward speed ratio is established with the engagement of the torque-transmitting mechanisms 50, 52, and 58. During the fifth forward speed ratio, the sun gear member 22 and ring gear member 34 are driven at a speed determined by the speed of the planet carrier assembly member 26 and the ring gear/sun gear tooth ratio of the planetary gearset 20. The planet carrier assembly member 36, planet carrier assembly member 46, and therefore output shaft 19 are driven at a speed determined by the speed of the ring gear member 34, the speed of the sun gear member 32, and the ring gear/sun gear tooth ratio of the planetary gearset 30. The numerical value of the fifth forward speed ratio is determined by the ring gear/sun gear tooth ratios of the planetary gearsets 20 and 30.

The sixth forward speed ratio is established with the engagement of the torque-transmitting mechanisms 50, 56, and 58. The simultaneous engagement of the torque-transmitting mechanisms 56 and 58 cause the planetary gearsets 30 and 40 to both rotate as single units. During the sixth forward speed ratio, the sun gear member 22 and therefore the planetary gearsets 30 and 40, and the output shaft 19 are driven at a speed determined by the speed of the planet carrier assembly member 26 and the ring gear/sun gear tooth ratio of the planetary gearset 20. The numerical value of the sixth forward speed ratio is determined by the ring gear/sun gear tooth ratio of the planetary gearset 20.

The seventh forward speed ratio is established with the engagement of the torque-transmitting mechanisms 50, 54, and 58. During the seventh forward speed ratio, the sun gear member 22 and ring gear member 34 are driven at a speed determined by the speed of the planet carrier assembly member 26 and the ring gear/sun gear tooth ratio of the planetary gearset 20. The sun gear member 32 and ring gear member 44 are driven at a speed determined by the speed of the ring gear member 34, the speed of the planet carrier assembly member 36, and the ring gear/sun gear tooth ratio of the planetary gearset 30. The planet carrier assembly member 46 and therefore the output shaft 19 are driven at a speed determined by the speed of the sun gear member 42, the speed of the ring gear member 44, and the ring gear/sun gear tooth ratio of the planetary gearset 40. The numerical value of the seventh forward speed ratio is determined by all three planetary gearsets 20, 30, and 40.

The truth table of FIG. 2 also provides an example of numerical values for the reverse speed ratio and the seven forward speed ratios that are available in the planetary gear arrangement 18. These speed ratio numbers are determined utilizing the example ring gear/sun gear tooth ratios R1/S1, R2/S2, and R3/S3, which are the ring gear/sun gear tooth ratios of the planetary gearsets 20, 30, and 40, respectively. The chart in FIG. 2 describes the ratio steps that are available between adjacent forward speed ratios and between the reverse and first forward speed ratio. As can be seen in the truth table, all of the forward single step interchanges in the forward direction are of the single transition variety.

Figures 3, 4:
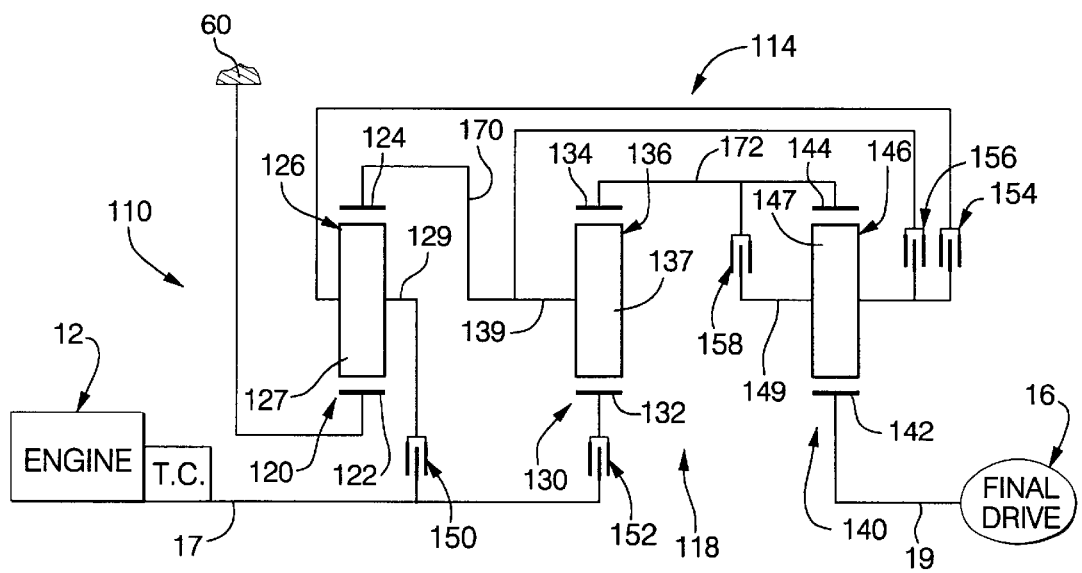
FIG. 3 is a schematic representation of a powertrain including another family member incorporating the present invention.
FIG. 4 is a truth table and chart describing some of the operating characteristics of the family member shown in FIG. 3.

A powertrain 110, shown in FIG. 3, includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and five torque-transmitting mechanisms 150, 152, 154, 156, and 158, which are all of the rotating type torque-transmitting mechanisms.

The planetary gearset 120 includes a sun gear member 122, a ring gear member 124, and a planet carrier assembly member 126. The planet carrier assembly member 126 includes a plurality of pinion gears 127 rotatably mounted on a planet carrier 129 and disposed in meshing relationship with both the sun gear member 122 and the ring gear member 124.

The planetary gearset 130 includes a sun gear member 132, a ring gear member 134, a planet carrier assembly member 136 which has a plurality of pinion gears 137 rotatably mounted on a planet carrier 139 and disposed in meshing relationship with the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier 149 and disposed in meshing relationship with both the sun gear member 142 and the ring gear member 144.

The sun gear member 122 is continuously connected with the transmission housing 60. The ring gear member 124 and planet carrier assembly member 136 are continuously interconnected by an interconnecting member 170, which is selectively connectible with the planet carrier assembly member 146. The ring gear member 134 and ring gear member 144 are continuously interconnected by an interconnecting member 172, which is selectively connectible with the planet carrier assembly member 146 through the torque-transmitting mechanism 158. The sun gear member 142 is continuously connected with the output shaft 19 and therefore with the final drive mechanism 16. The input shaft 17 is selectively connectible with the planet carrier assembly member 126 through the torque-transmitting mechanism 150, and with the sun gear member 132 through the torque-transmitting mechanism 152. The planet carrier assembly member 126 is selectively connectible with the planet carrier assembly member 146 through the torque-transmitting mechanism 154. It can be noted that the planet carrier assembly member 126, sun gear member 132, and planet carrier assembly member 146 are not continuously interconnected with other gear members or with the interconnecting members of the planetary gear arrangement 118.

The truth table shown in FIG. 4 describes the engagement combinations and sequences for the torque-transmitting mechanisms 150, 152, 154, 156, and 158, such that six forward speed ratios and one reverse speed ratio are established between the input shaft 17 and the output shaft 19. It should be noted that the torque-transmitting mechanisms are engaged in combinations of three.

To establish the reverse speed ratio, the torque-transmitting mechanisms 150, 152, and 154 are selectively engaged. During the reverse speed ratio, the ring gear member 124 and planet carrier assembly member 136 are driven at a speed determined by the speed of the planet carrier assembly member 126 and the ring gear/sun gear tooth ratio of the planetary gearset 120. The ring gear members 134 and 144 are driven at a speed determined by the speed of the sun gear member 132, the speed of the planet carrier assembly member 136, and the ring gear/sun gear tooth ratio of the planetary gearset 130. The sun gear member 142 and therefore output shaft 19 are driven at a speed determined by the speed of the ring gear member 144, the speed of the planet carrier assembly member 146, and the ring gear/sun gear tooth ratio of the planetary gearset 140. The numerical value of the reverse speed ratio is determined by the ring gear/sun gear tooth ratios of all three planetary gearsets 120, 130, and 140.

The first forward speed ratio is established with the engagement of the torque-transmitting mechanisms 152, 154, and 158. The torque-transmitting mechanisms 152 and 154 can remain engaged through the neutral condition, thereby simplifying the forward/reverse shift. The torque transmitting mechanism 158 places the planetary gearset 140 in a one to one condition. During the first forward speed ratio, the planet carrier assembly member 136 and ring gear member 124 are driven at a speed determined by the speed of the sun gear member 132, the speed of the ring gear member 134, and the ring gear/sun gear tooth ratio of the planetary gearset 130. The planet carrier assembly member 126, ring gear member 134, and the planetary gearset 140 are driven at a speed determined by the speed of the ring gear member 124 and the ring gear/sun gear tooth ratio of the planetary gearset 120. The numerical value of the first forward speed ratio is determined by the ring gear/sun gear tooth ratios of the planetary gearsets 120 and 130.

The second forward speed ratio is established with the engagement of the torque-transmitting mechanisms 152, 154, and 156. The combination of torque-transmitting mechanisms 154 and 156 cause the planetary gearset 120 to be held stationary as well as the planet carrier assembly members 136 and 146. The ring gear members 134 and 144 are driven at a speed determined by the speed of the sun gear member 132 and the ring gear/sun gear tooth ratio of the planetary gearset 130. The sun gear member 142 and therefore output shaft 19 are driven at a speed determined by the speed of the ring gear member 144 and the ring gear/sun gear tooth ratio of the planetary gearset 140. The numerical value of the second forward speed ratio is determined by the ring gear/sun gear tooth ratios of the planetary gearsets 130 and 140.

The third forward speed ratio is established with the engagement of the torque-transmitting mechanisms 152, 156, and 158. The engagement of the torque-transmitting mechanisms 156 and 158 cause the planetary gearsets 130 and 140 to rotate as units. The sun gear member 132 and therefore output shaft 19 are driven at a speed determined by the speed of the input shaft 17. Thus, the third forward speed ratio is a direct drive having a numerical value of one.

The fourth forward speed ratio is established with the engagement of the torque-transmitting mechanisms 150, 152, and 156. During the fourth forward speed ratio, the ring gear member 124, the planet carrier assembly member 136, and planet carrier assembly member 146 are driven at a speed determined by the speed of the planet carrier assembly member 126 and the ring gear/sun gear tooth ratio of the planetary gearset 120. The ring gear members 134 and 144 are driven at a speed determined by the speed of the planet carrier assembly member 136, the speed of the sun gear member 132, and the ring gear/sun gear tooth ratio of the planetary gearset 130. The sun gear member 142 and therefore output shaft 19 are driven at a speed determined by the speed of the sun gear member 144, the speed of the planet carrier assembly member 146, and the ring gear/sun gear tooth ratio of the planetary gearset 140. The numerical value of the fourth forward speed ratio is determined by all three planetary gearsets 120, 130, and 140.

The fifth forward speed ratio is established with the engagement of the torque-transmitting mechanisms 150, 156, and 158. With this combination, the planetary gearsets 130, and 140, and therefore output shaft 19 rotate in unison with the ring gear member 124. The ring gear member 124 is driven at a speed determined by the speed of the planet carrier assembly member 126 and the ring gear/sun gear tooth ratio of the planetary gearset 120. The numerical value of the fifth forward speed ratio is determined by the ring gear/sun gear tooth ratio of the planetary gearset 120.

The sixth forward speed ratio is established with the engagement of the torque-transmitting mechanisms 150, 152, and 158. During the sixth forward speed ratio, the ring gear member 134 and planetary gearset 140 rotate in unison. The ring gear member 124 and planet carrier assembly member 136 are driven at a speed determined by the speed of the planet carrier assembly member 126 and the ring gear/sun gear tooth ratio of the planetary gearset 120. The ring gear member 134 and therefore output shaft 19 are driven at a speed determined by the speed of the sun gear member 132, the speed of the planet carrier assembly member 136, and the ring gear/sun gear tooth ratio of the planetary gearset 130. The numerical value of the sixth forward speed ratio is determined by the ring gear/sun gear tooth ratios of the planetary gearsets 120 and 130.

The truth table of FIG. 4 provides a numerical example of the ring gear/sun gear tooth ratios that can be attained in the planetary gear arrangement 118 with the example of ring gear/sun gear tooth ratios R1/S1, R2/S2, and R3/S3 which represent the ring gear/sun gear tooth ratios of the planetary gearsets 120, 130, and 140. Also provided in FIG. 4 is a numerical example of the ratio steps that are available between adjacent forward speed ratios as well as between the reverse and first forward speed ratio. The truth table, in showing the combinations of engagements, makes it evident that the single step and double step forward interchanges are of the single transition variety.

Figures 5, 6:
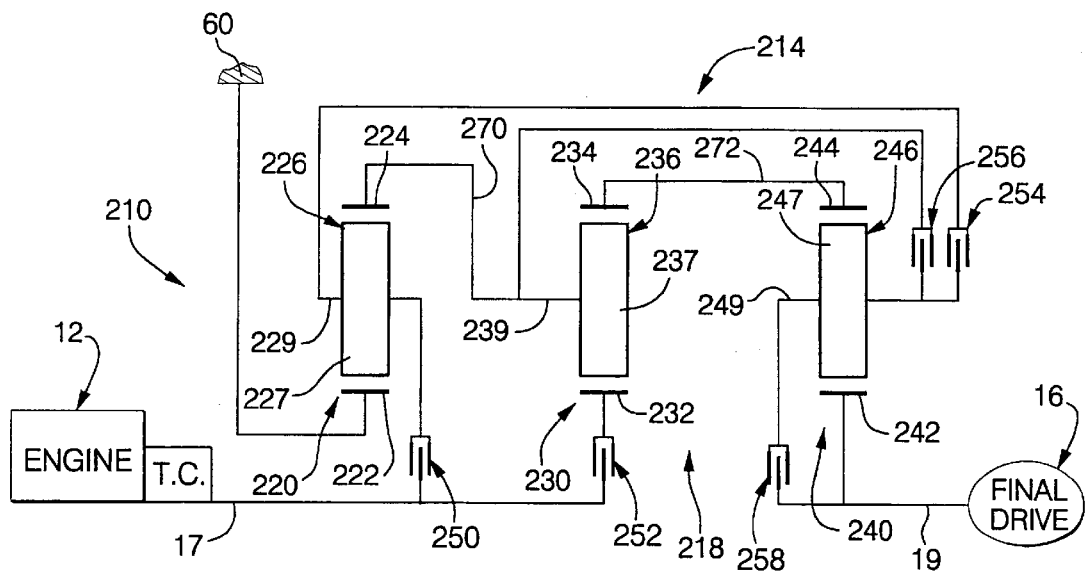
FIG. 5 is a schematic representation of a powertrain including another family member incorporating the present invention.
FIG. 6 is a truth table and chart describing some of the operating characteristics of the family member shown in FIG. 5.

A powertrain 210, shown in FIG. 5, includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, and five torque-transmitting mechanisms 250, 252, 254, 256, and 258, all of which are of the rotating type torque-transmitting mechanisms.

The planetary gearset 220 includes a sun gear member 222, a ring gear member 224, and a planet carrier assembly member 226. The planet carrier assembly member 226 includes a plurality of pinion gears 227 rotatably mounted on a planet carrier 229 and disposed in meshing relationship with both the sun gear member 222 and the ring gear member 224.

The planetary gearset 230 includes a sun gear member 232, a ring gear member 234, a planet carrier assembly member 236 which has a plurality of pinion gears 237 rotatably mounted on a planet carrier 239 and disposed in meshing relationship with the sun gear member 232 and the ring gear member 234.

The planetary gearset 240 includes a sun gear member 242, a ring gear member.244, and a planet carrier assembly member 246. The planet carrier assembly member 246 includes a plurality of pinion gears 247 rotatably mounted on a planet carrier 249 and disposed in meshing relationship with both the sun gear member 242 and the ring gear member 244.

The ring gear member 224 and planet carrier assembly member 236 are continuously interconnected by an interconnecting member 270. The sun gear member 222 is continuously connected with the transmission housing 60. The ring gear members 234 and 244 are continuously interconnected by an interconnecting member 272. The sun gear member 242 is continuously connected with the output shaft 19. The sun gear member 233 is selectively connectible with the planet carrier assembly member 226 through the torque-transmitting mechanism 250, and selectively connectible with the sun gear member 232 through the torque-transmitting mechanism 252. The planet carrier assembly member 246 is selectively connectible with the planet carrier assembly member 226 through the torque-transmitting mechanism 254, selectively connectible with the interconnecting member 270 through the torque-transmitting mechanism 256, and selectively connectible with the output shaft 19 and therefore the sun gear member 242 through the torque-transmitting mechanism 258.

The truth table of FIG. 6 describes the engagement combinations and sequences for the torque-transmitting mechanisms in order to establish six forward speed ratios and one reverse speed ratio between the input shaft 17 and the output shaft 19 through the planetary gear arrangement 218. As noted in the truth table, the torque-transmitting mechanisms are engaged in combinations of three.

The reverse speed ratio is established with the engagement of the torque-transmitting mechanisms 250, 252, and 254. During the reverse speed ratio, the planet carrier assembly member 226, the planet carrier assembly member 246, and the sun gear member 232 are all driven by the input shaft 17. The ring gear member 224 and planet carrier assembly member 236 are driven at a speed determined by the speed of the planet carrier assembly member 226 and the ring gear/sun gear tooth ratio of the planetary gearset 220. The ring gear members 234 and 244 are driven at a speed determined by the speed of the planet carrier assembly member 236, the speed of the sun gear member 232, and the ring gear/sun gear tooth ratio of the planetary gearset 230. The sun gear member 242 and therefore output shaft 19 are driven at a speed determined by the speed of the ring gear member 244, the speed of the planet carrier assembly member 246, and the ring gear/sun gear tooth ratio of the planetary gearset 240. The numerical value of the reverse speed ratio is determined by the ring gear/sun gear tooth ratios of all three planetary gearsets 220, 230, and 240.

The first forward speed ratio is established with the engagement of the torque-transmitting mechanism 252, 254, and 258. During the first forward speed ratio, the planet carrier assembly member 236 and ring gear member 224 are driven at a speed determined by the speed of the sun gear member 232, the speed of the ring gear member 234, and the ring gear/sun gear tooth ratio of the planetary gearset 230. The planet carrier assembly member 226 and the output shaft 19, which is effectively connected thereto, are driven at a speed determined by the speed of the ring gear member 224 and the ring gear/sun gear tooth ratio of the planetary gearset 220. The numerical value of the first forward speed ratio is determined by the ring gear/sun gear tooth ratios of the planetary gearsets 220 and 230.

The second forward speed ratio is established with the engagement of the torque-transmitting mechanisms 252, 254, and 256. With this combination of engagements, the planet carrier assembly members 236 and 246, as well as the planetary gearset 220, are held stationary. The ring gear members 234 and 244 are driven at a speed determined by the speed of the sun gear member 232, and the ring gear/sun gear tooth ratio of the planetary gearset 230. The sun gear member 242 and therefore output shaft 19 are driven at a speed determined by the speed of the ring gear member 244 and the ring gear/sun gear tooth ratio of the planetary gearset 240. The numerical value of the second forward speed ratio is determined by the ring gear/sun gear tooth ratios of the planetary gearsets 230 and 240.

To establish the third forward speed ratio, the torque-transmitting mechanisms 252, 256, and 258 are engaged. This combination of engagements effectively causes the planetary gearsets 230 and 240 and therefore output shaft 19 to rotate in unison with the input shaft 17 whereby the third forward speed ratio is a direct drive having a numerical value of one.

The fourth forward speed ratio is established with the engagement of the torque-transmitting mechanisms 250, 252, and 256. During the fourth forward speed ratio, the ring gear member 224, planet carrier assembly member 236, and planet carrier assembly member 246 are driven at a speed determined by the speed of the planet carrier assembly member 226 and the ring gear/sun gear tooth ratio of the planetary gearset 220. The ring gear members 234 and 244 are driven at a speed determined by the speed of the sun gear member 232, the speed of the planet carrier assembly member 236, and the ring gear/sun gear tooth ratio of the planetary gearset 230. The sun gear member 242 and therefore output shaft 19 are driven at a speed determined by the speed of the ring gear member 244, the speed of planet carrier assembly member 246, and the ring gear/sun gear tooth ratio of the planetary gearset 240. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 250, 256, and 258. This combination of engagements effectively connects the ring gear member 224 with the output shaft 19. The ring gear member 224 and therefore the output shaft 19 are driven at a speed determined by the speed of the planet carrier assembly member 226, and the ring gear/sun gear tooth ratio of the planetary gearset 220. The numerical value of the fifth forward speed ratio is determined by the ring gear/sun gear tooth ratio of the planetary gearset 220.

The sixth forward speed ratio is established with the engagement of the torque-transmitting mechanisms 250, 252, and 258. The engagement of the torque-transmitting mechanism 258 causes the planetary gearset 240 and therefore output shaft 19 to rotate in unison. The ring gear member 224 and therefore planet carrier assembly member 236 are driven at a speed determined by the speed of the planet carrier assembly member 226 and the ring gear/sun gear tooth ratio of the planetary gearset 220. The ring gear member 234 and therefore output shaft 19 are driven at a speed determined by the speed of the sun gear member 232, the speed of the planet carrier assembly member 236, and the ring gear/sun gear tooth ratio of the planetary gearset 230. The numerical value of the sixth forward speed ratio is determined by the ring gear/sun gear tooth ratios of the planetary gearsets 220 and 230.

The truth table of FIG. 6 provides an example of the numerical values for the speed ratios of the planetary gear arrangement 218. These numerical values are established using the example ring gear/sun gear tooth ratios R1/S1, R2/S2, and R3/S3, which represent the ring gear/sun gear tooth ratios of the planetary gearsets 220, 230, and 240, respectively. Also provided in FIG. 6 is a chart of the ratio steps between adjacent forward speed ratios and the between the reverse and first forward speed ratio. These numbers are, of course, determined by the speed ratio values given in the truth table.

Figures 7, 8:
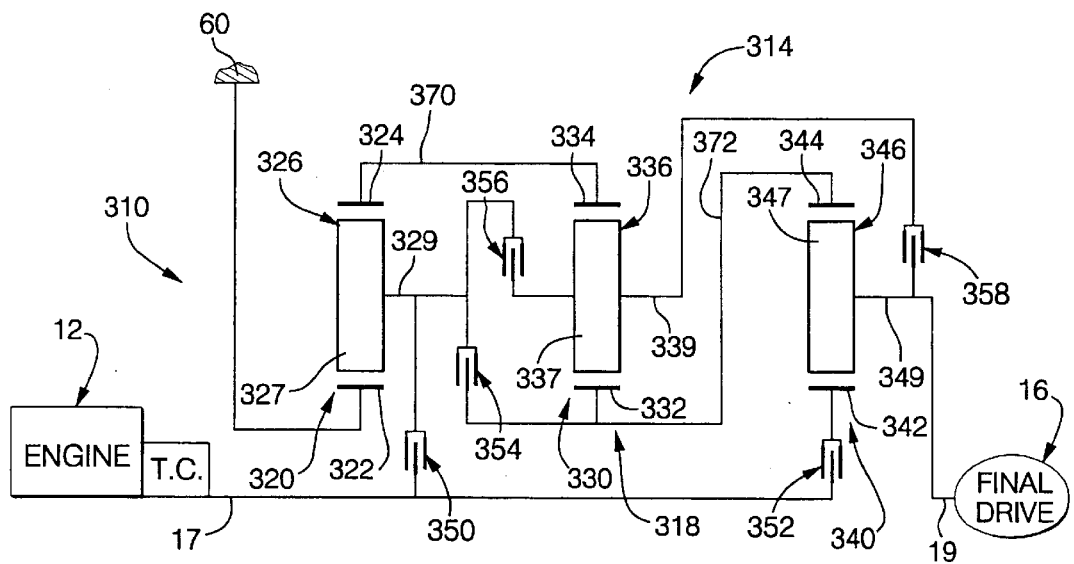
FIG. 7 is a schematic representation of a powertrain including another family member incorporating the present invention.
FIG. 8 is a truth table and chart describing some of the operating characteristics of the family member shown in FIG. 7.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, and five rotating type torque-transmitting mechanisms 350, 352, 354, 356, and 358.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329 and disposed in meshing relationship with both the sun gear member 322 and the ring gear member 324.

The planetary gearset 330 includes a sun gear member 332, a ring gear member 334, a planet carrier assembly member 336 which has a plurality of pinion gears 337 rotatably mounted on a planet carrier 339 and disposed in meshing relationship with the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier 349 and disposed in meshing relationship with both the sun gear member 342 and the ring gear member 344.

The sun gear member 322 is continuously connected with the transmission housing 60. The planet carrier assembly member 346 is continuously connected with the output shaft 19. The ring gear member 324 is continuously interconnected with the ring gear member 334 through a continuously interconnecting member 370. The sun gear member 332 and ring gear member 344 are continuously interconnected by an interconnecting member 372. The input shaft 17 is selectively connectible with the planet carrier assembly member 326, through the torque-transmitting mechanism 350, and selectively connectible with the sun gear member 342 through the torque-transmitting mechanism 352. The planet carrier assembly member 326 is selectively connectible with the interconnecting member 372 through the torque-transmitting mechanism 354, and selectively connectible with the planet carrier assembly member 336 through the torque-transmitting mechanism 356. The planet carrier assembly member 336 is selectively connectible with the planet carrier assembly member 346 and therefore output shaft 19 through the torque-transmitting mechanism 358. The sun gear member 342, the planet carrier assembly member 336, and planet carrier assembly member 326 are noncontinuously interconnected members.

As seen in the truth table of FIG. 8, the torque-transmitting mechanisms are selectively engaged in combinations of three to provide six forward speed ratios and one reverse speed ratio between the input shaft 17 and the output shaft 19 through the planetary gear arrangement 318.

The reverse speed ratio is established with the engagement of the torque-transmitting mechanisms 350, 352, and 356. During the reverse speed ratio, the sun gear member 342, planet carrier assembly member 326, and planet carrier assembly member 336 are all driven by the input shaft 17. The ring gear member 324 and ring gear member 334 are driven at a speed determined by the speed of the planet carrier assembly member 326 and the ring gear/sun gear tooth ratio of the planetary gearset 320. The sun gear member 332 and ring gear member 344 are driven at a speed determined by the speed of the ring gear member 334, the speed of the planet carrier assembly member 336, and the ring gear/sun gear tooth ratio of the planetary gearset 330. The planet carrier assembly member 346 and therefore output shaft 19 are driven at a speed determined by the speed of the sun gear member 342, the speed of the ring gear member 344 and the ring gear/sun gear tooth ratio of the planetary gearset 340. The numerical value of the reverse speed ratio is determined by the ring gear/sun gear tooth ratios of all three planetary gearsets 320, 330, and 340.

The first forward speed ratio is established with the engagement of the torque-transmitting mechanisms 352, 356, and 358. During the first forward speed ratio, the ring gear member 344 and sun gear member 332 are driven at a speed determined by the speed of the sun gear member 342 and the planet carrier assembly member 346. The ring gear member 324 and ring gear member 334 are driven at a speed determined by the speed of the sun gear member 332, the speed of the planet carrier assembly member 336, and the ring gear/sun gear tooth ratio of the planetary gearset 330. The planet carrier assembly member 326, planet carrier assembly member 336, planet carrier assembly member 346 and therefore output shaft 19 are driven at a speed determined by the speed of the ring gear member 324 and the ring gear/sun gear tooth ratio of the planetary gearset 320. The numerical value of the first forward speed ratio is determined by the ring gear/sun gear tooth ratios of all three planetary gearsets 320, 330, and 340.

The second forward speed ratio is established with the engagement of the torque-transmitting mechanisms 352, 354, and 356. The combination of the torque-transmitting mechanisms 354 and 356 effectively hold the ring gear member 334 stationary. The planet carrier assembly member 346 and therefore output shaft 19 are driven at a speed determined by the speed of the sun gear member 342 and the ring gear/sun gear tooth ratio of the planetary gearset 340. The numerical value of the second forward speed ratio is determined by the ring gear/sun gear tooth ratio of the planetary gearset 340.

The third forward speed ratio is established with the engagement of the torque-transmitting mechanisms 352, 354, and 358. During the third forward speed ratio, the ring gear member 344, sun gear member 332, and planet carrier assembly member 326 are driven at a speed determined by the speed of the sun gear member 342, the speed of the planet carrier assembly member 346, and the ring gear/sun gear tooth ratio of the planetary gearset 340. The ring gear member 324 and ring gear member 334 are driven at a speed determined by the speed of the planet carrier assembly member 326 and the ring gear/sun gear tooth ratio of the planetary gearset 320. The planet carrier assembly member 336, planet carrier assembly member 346 and therefore output shaft 19 are driven at a speed determined by the speed of the sun gear member 332, the speed of the ring gear member 334, and the ring gear/sun gear tooth ratio of the planetary gearset 330. The numerical value of the third forward speed ratio is determined by the ring gear/sun gear tooth ratios of all three planetary gearsets 320, 330, and 340.

The fourth forward speed ratio is established with the engagement of the torque-transmitting mechanisms 350, 352, and 354. This combination of torque-transmitting mechanism engagements effectively connects the input shaft 17 directly with the output shaft 19 through the planetary gear arrangement 318 resulting in a direct drive having a numerical value of one.

The fifth forward speed ratio is established with the engagement of the torque-transmitting mechanisms 350, 354, and 358. During the fifth forward speed ratio, the ring gear members 324 and 334 are driven at a speed determined by the speed of the input shaft 17 through the planet carrier assembly member 326, and the ring gear/sun gear tooth ratio of the planetary gearset 320. The planet carrier assembly member 336 and therefore output shaft 19 are driven at a speed determined by the speed of the ring gear member 334, the speed of the sun gear member 332, and the ring gear/sun gear tooth ratio of the planetary gearset 330. The numerical value of the fifth forward speed ratio is determined by the ring gear/sun gear tooth ratios of the planetary gearsets 320 and 330.

The sixth forward speed ratio is established with the engagement of the torque-transmitting mechanisms 350, 352, and 358. During the sixth forward speed ratio, the ring gear members 324 and 334 are driven at a speed determined by the speed of the planet carrier assembly member 326 and the ring gear/sun gear tooth ratio of the planetary gearset 320. The sun gear member 332 and ring gear member 344 are driven at a speed determined by the speed of the ring gear member 334, the speed of the planet carrier assembly member 336, and the ring gear/sun gear tooth ratio of the planetary gearset 330. The planet carrier assembly member 346 and therefore output shaft 19 are rotated at a speed determined by the speed of the sun gear member 342, the speed of the ring gear member 344, and the ring gear/sun gear tooth ratio of the planetary gearset 340. The numerical value of the sixth forward speed ratio is determined by the ring gear/sun gear tooth ratios of all three planetary gearsets 320, 330, and 340.

The truth table of FIG. 8 provides an example of the numerical values that can be attained in the planetary gear arrangement 318 when the ring gear/sun gear tooth ratios of the planetary gearsets 320, 330, and 340 are provided as represented as R1/S1, R2/S2, and R3/S3, respectively. The chart of FIG. 8 provides an example of the ratio steps between adjacent forward speed ratios and between the reverse and first forward speed ratio. The truth table of FIG. 8 also makes it evident that each of the forward single step and double step interchanges are of the single transition variety thereby simplifying the ratio interchanges.

Figures 9, 10:
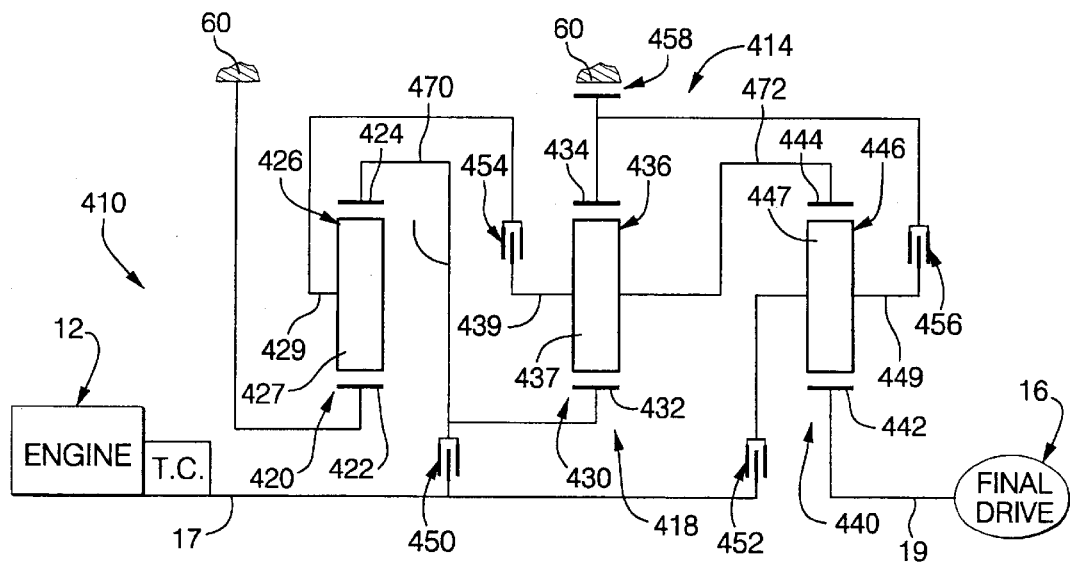
FIG. 9 is a schematic representation of a powertrain including another family member incorporating the present invention.
FIG. 10 is a truth table and chart describing some of the operating characteristics of the family member shown in FIG. 9.

A powertrain 410, shown in FIG. 9, includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, and five torque-transmitting mechanisms 450, 452, 454, 456, and 458. The torque-transmitting mechanism 458 is a stationary type torque-transmitting mechanism, commonly termed a brake, while the torque-transmitting mechanisms 450, 452, 454, and 456 are of the rotating type torque-transmitting mechanisms.

The planetary gearset 420 includes a sun gear member 422, a ring gear member 424, and a planet carrier assembly member 426. The planet carrier assembly member 426 includes a plurality of pinion gears 427 rotatably mounted on a planet carrier 429 and disposed in meshing relationship with both the sun gear member 422 and the ring gear member 424.

The planetary gearset 430 includes a sun gear member 432, a ring gear member 434, a planet carrier assembly member 436 which has a plurality of pinion gears 437 rotatably mounted on a planet carrier 439 and disposed in meshing relationship with the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier 449 and disposed in meshing relationship with both the sun gear member 442 and the ring gear member 444.

The sun gear member 422 is continuously connected with the transmission housing 60. The ring gear member 424 and sun gear member 432 are continuously interconnected through an interconnecting member 470. The planet carrier assembly member 436 and ring gear member 444 are continuously interconnected through an interconnecting member 472. The output shaft 19 is continuously connected with the sun gear member 442. The input shaft 17 is selectively connectible with the interconnecting member 470 through the torque-transmitting mechanism 450, and with the planet carrier assembly member 446 through the torque-transmitting mechanism 452. The planet carrier assembly member 426 is selectively connectible with the interconnecting member 472 through the torque-transmitting mechanism 454. The ring gear member 434 is selectively connectible with the planet carrier assembly member 446 through the torque-transmitting mechanism 456, and selectively connectible with the transmission housing 60 through the torque-transmitting mechanism 458.

The truth table of FIG. 10 shows that the torque-transmitting mechanisms are selectively engaged in combinations of three to establish six forward speed ratios and one reverse speed ratio between the input shaft 17 and the output shaft 19 through the planetary gear arrangement 418.

The reverse speed ratio is established with the engagement of the torque-transmitting mechanisms 450, 456, and 458. During the reverse speed ratio, the ring gear member 434 and planet carrier assembly member 446 are held stationary. The planet carrier assembly member 436 and ring gear member 444 are driven at a speed determined by the speed of the sun gear member 432 and the ring gear/sun gear tooth ratio of the planetary gearset 430. The sun gear member 442 and therefore output shaft 19 are driven at a speed determined by the speed of the ring gear member 444 and the ring gear/sun gear tooth ratio of the planetary gearset 440. The numerical value of the reverse speed ratio is determined by the ring gear/sun gear tooth ratios of the planetary gearsets 430 and 440.

The first forward speed ratio is established with the engagement of the torque-transmitting mechanisms 450, 454, and 456. During the first forward speed ratio, the planet carrier assembly member 426, planet carrier assembly member 436, and ring gear member 444 are driven at a speed determined by the speed of the ring gear member 424 and the ring gear/sun gear tooth ratio of the planetary gearset 420. The ring gear member 434 and planet carrier assembly member 446 are driven at a speed determined by the speed of the sun gear member 432, the speed of the planet carrier assembly member 436, and the ring gear/sun gear tooth ratio of the planetary gearset 430. The sun gear member 442 and therefore output shaft 19 are driven at a speed determined by the speed of the ring gear member 444, the speed of the planet carrier assembly member 446, and the ring gear/sun gear tooth ratio of the planetary gearset 440. The numerical value of the first forward speed ratio is determined by the ring gear/sun gear tooth ratios of all three planetary gearsets 420, 430, and 440.

The second forward speed ratio is established with the engagement of the torque-transmitting mechanisms 452, 454, and 456. During the second forward speed ratio, the sun gear member 432 and ring gear member 424 are driven at a speed determined by the speed of the ring gear member 434, the speed of the planet carrier assembly member 436, and the ring gear/sun gear tooth ratio of the planetary gearset 430. The planet carrier assembly member 426, planet carrier assembly member 436, and ring gear member 444 are driven at a speed determined by the speed of the ring gear member 424 and the ring gear/sun gear tooth ratio of the planetary gearset 420. The sun gear member 442 and therefore output shaft 19 are driven at a speed determined by the speed of the planet carrier assembly member 446, the speed of the ring gear member 444, and the ring gear/sun gear tooth ratio of the planetary gearset 440. The numerical value of the second forward speed ratio is determined by the ring gear/sun gear tooth ratios of all three planetary gearsets 420, 430, and 440.

The third forward speed ratio is established with the engagement of the torque-transmitting mechanisms 450, 452, and 456. This combination of engagements effectively connects the input shaft 17 directly with the output shaft 19 through the planetary gearsets 430 and 440. This is therefore a direct drive having a numerical value of one.

The fourth forward speed ratio is established with the engagement of the torque-transmitting mechanisms 450, 452, and 454. During the fourth forward speed ratio, the planet carrier assembly member 426, the planet carrier assembly member 436, and ring gear member 444 are driven at a speed determined by the speed of the ring gear member 424 and the ring gear/sun gear tooth ratio of the planetary gearset 420. The sun gear member 442 and therefore output shaft 19 are driven at a speed determined by the speed of the planet carrier assembly member 446, the speed of the ring gear member 444, and the ring gear/sun gear tooth ratio of the planetary gearset 440. The numerical value of the fourth forward speed ratio is determined by the ring gear/sun gear tooth ratios of the planetary gearsets 420 and 440.

The fifth forward speed ratio is established with the engagement of the torque-transmitting mechanisms 450, 452, and 458. During the fifth forward speed ratio, the planet carrier assembly member 436 and ring gear member 444 are driven at a speed determined by the speed of the sun gear member 432 and the ring gear/sun gear tooth ratio of the planetary gearset 430. The sun gear member 442 and therefore output shaft 19 are driven at a speed determined by the speed of the ring gear member 444, the speed of the planet carrier assembly member 446, and the ring gear/sun gear tooth ratio of the planetary gearset 440. The numerical value of the fifth forward speed ratio is determined by the ring gear/sun gear tooth ratios of the planetary gearsets 430 and 440.

The sixth forward speed ratio is established with the engagement of the torque-transmitting mechanisms 452, 454, and 458. During the sixth forward speed ratio, the sun gear member 432 and ring gear member 424 are driven at a speed determined by the speed of the planet carrier assembly member 436 and the ring gear/sun gear tooth ratio of the planetary gearset 430. The planet carrier assembly member 426, planet carrier assembly member 436, and ring gear member 444 are driven at a speed determined by the speed of the ring gear member 424 and the ring gear/sun gear tooth ratio of the planetary gearset 420. The sun gear member 442 and therefore output shaft 19 are driven at a speed determined by the speed of the planet carrier assembly member 446, the, speed of the ring gear member 444, and the ring gear/sun gear tooth ratio of the planetary gearset 440. The numerical value of the sixth forward speed ratio is determined by the ring gear/sun gear tooth ratios of all three planetary gearsets 420, 430, and 440.

The truth table of FIG. 10 provides a pictorial representation of the engagement combinations and sequences, and those skilled in the art will recognize that each of the single step forward ratio interchanges and double step forward ratio interchanges are of the single transition variety. The truth table also provides an example of numerical values that are available with the planetary gear arrangement 418 when utilizing the example ring gear/sun gear tooth ratios R1/S1, R2/S2, and R3/S3 representing the ring gear/sun gear tooth ratios of the planetary gearsets 420, 430, and 440, respectively. Also provided in FIG. 10 is a chart of the ratio steps between adjacent forward speed ratios and between the reverse and first forward speed ratio.

Figures 11, 12:
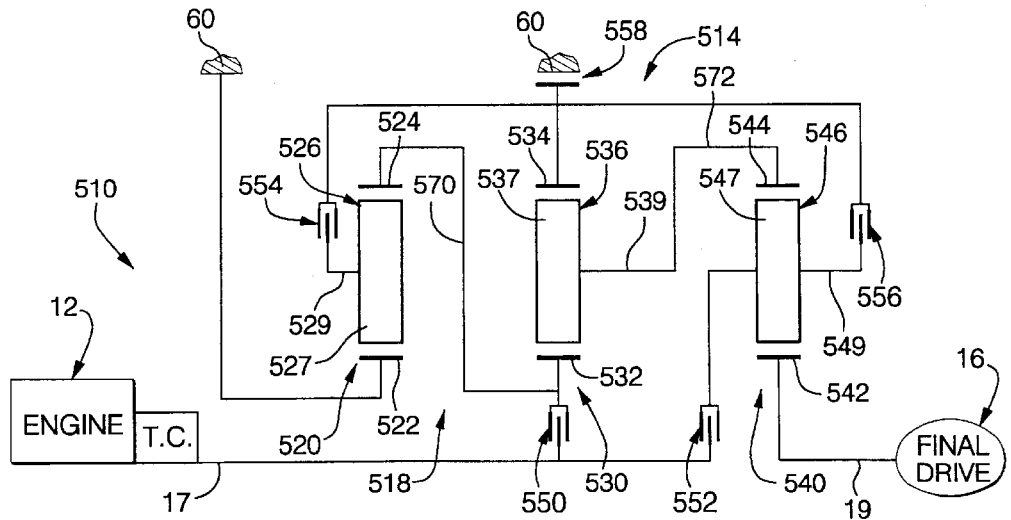
FIG. 11 is a schematic representation of a powertrain including another family member incorporating the present invention.
FIG. 12 is a truth table and chart describing some of the operating characteristics of the family member shown in FIG. 11.

A powertrain 510, shown in FIG. 11, includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and four rotating type torque-transmitting mechanisms 550, 552, 554, and 556, and one stationary type torque-transmitting mechanism 558.

The planetary gearset 520 includes a sun gear member 522, a ring gear member 524, and a planet carrier assembly member 526. The planet carrier assembly member 526 includes a plurality of pinion gears 527 rotatably mounted on a planet carrier 529 and disposed in meshing relationship with both the sun gear member 522 and the ring gear member 524.

The planetary gearset 530 includes a sun gear member 532, a ring gear member 534, a planet carrier assembly member 536 which has a plurality of pinion gears 537 rotatably mounted on a planet carrier 539 and disposed in meshing relationship with the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier 549 and disposed in meshing relationship with both the sun gear member 542 and the ring gear member 544.

The sun gear member 522 is continuously connected with the transmission housing 60. The ring gear member 524 and sun gear member 532 are continuously interconnected by an interconnecting member 570. The planet carrier assembly member 536 and ring gear member 544 are continuously interconnected by an interconnecting member 572. The sun gear member 542 is continuously connected with the output shaft 19. The input shaft 17 is selectively connectible with the interconnecting member 570 through the torque-transmitting mechanism 550, and with the planet carrier assembly member 546 through the torque-transmitting mechanism 552. The ring gear member 534 is selectively connectible with the planet carrier assembly member 526 through the torque-transmitting mechanism 554, selectively connectible with the planet carrier assembly member 546 through the torque-transmitting mechanism 556, and selectively connectible with the transmission housing 60 through the torque-transmitting mechanism 558. The planet carrier assembly member 526, ring gear member 534, and planet carrier assembly member 546 are noncontinuously interconnected members of the planetary gear arrangement 518.

As seen in the truth table of FIG. 12, the torque-transmitting mechanisms are selectively engaged in combinations of three to provide six forward speed ratios and one reverse speed ratio in the planetary gear arrangement 518 between the input shaft 17 and the output shaft 19.

The reverse speed ratio is established with the engagement of the torque-transmitting mechanisms 550, 556, and 558. During the reverse speed ratio, the planet carrier assembly member 536 and ring gear member 544 are rotated at a speed determined by the speed of the sun gear member 532 and the ring gear/sun gear tooth ratio of the planetary gearset 530. The sun gear member 542 and therefore output shaft 19 are driven at a speed determined by the speed of the ring gear member 544 and the ring gear/sun gear tooth ratio of the planetary gearset 540. The numerical value of the reverse speed ratio is determined by the ring gear/sun gear tooth ratios of the planetary gearsets 530 and 540.

The first forward speed ratio is established with the engagement of the torque-transmitting mechanisms 550, 554, and 556. During the first forward speed ratio, the planet carrier assembly member 526, the ring gear member 534, and the planet carrier assembly member 546 are driven at a speed determined by the speed of the ring gear member 524 and the ring gear/sun gear tooth ratio of the planetary gearset 520. The planet carrier assembly member 536 and ring gear member 544 are driven at a speed determined by the speed of the sun gear member 532, the speed of the ring gear member 534, and the ring gear/sun gear tooth ratio of the planetary gearset 530. The sun gear member 542 and therefore output shaft 19 are driven at a speed determined by the speed of the planet carrier assembly member 546, the speed of the ring gear member 544, and the ring gear/sun gear tooth ratio of the planetary gearset 540. The numerical value of the first forward speed ratio is determined by the ring gear/sun gear tooth ratios of all three planetary gearsets 520, 530, and 540.

The second forward speed ratio is established with the engagement of the torque-transmitting mechanisms 552, 554, and 556. During the second forward speed ratio, the planet carrier assembly member 546, the ring gear member 534, and planet carrier assembly member 526 are driven by the input shaft 17. The ring gear member 524 and sun gear member 532 are driven at a speed determined by the speed of the planet carrier assembly member 526 and the ring gear/sun gear tooth ratio of the planetary gearset 520. The planet carrier assembly member 536 and ring gear member 544 are driven at a speed determined by the speed of the sun gear member 532, the speed of the ring gear member 534, and the ring gear/sun gear tooth ratio of the planetary gearset 530. The sun gear member 542 and therefore output shaft 19 are driven at a speed determined by the speed of the planet carrier assembly member 546, the speed of the ring gear member 544, and the ring gear/sun gear tooth ratio of the planetary gearset 540. The numerical value of the second forward speed ratio is determined by the ring gear/sun gear tooth ratios of all three planetary gearsets 520, 530, and 540.

The third forward speed ratio is established with the engagement of the torque-transmitting mechanisms 550, 552, and 556. This combination of engagements effectively interconnects the planetary gearsets 530 and 540, such that the input shaft 17 and output shaft 19 rotate in unison. The numerical value of the third forward speed ratio is one.

The fourth forward speed ratio is established with the engagement of the torque-transmitting mechanisms 550, 552, and 554. During the fourth forward speed ratio, the planet carrier assembly member 546, sun gear member 532, and ring gear member 524 are all driven by the input shaft 17. The planet carrier assembly member 526 and ring gear member 534 are driven at a speed determined by the speed of the ring gear member 524 and the ring gear/sun gear tooth ratio of the planetary gearset 520. The planet carrier assembly member 536 and ring gear member 544 are driven at a speed determined by the speed of the sun gear member 532, the speed of the ring gear member 534, and the ring gear/sun gear tooth ratio of the planetary gearset 530. The sun gear member 542 and therefore output shaft 19 are driven at a speed determined by the speed of the planet carrier assembly member 546, the speed of the ring gear member 544 and the ring gear/sun gear tooth ratio of the planetary gearset 540. The numerical value of the fourth forward speed ratio is determined by the ring gear/sun gear tooth ratios of all three planetary gearsets 520, 530, and 540.

The fifth forward speed ratio is established with the engagement of the torque-transmitting mechanisms 550, 552, and 558. During the fifth forward speed ratio, the planet carrier assembly member 536 and the ring gear member 544 are driven forwardly at a speed determined by the speed of sun gear member 532 and the ring gear/sun gear tooth ratio of the planetary gearset 530. The sun gear member 542 and therefore output shaft 19 are driven at a speed determined by the speed of the ring gear member 544, the speed of the planet carrier assembly member 546, and the ring gear/sun gear tooth ratio of the planetary gearset 540. The numerical value of the fifth forward speed ratio is determined by the ring gear/sun gear tooth ratios of the planetary gearsets 530 and 540.

The sixth forward speed ratio is established with the engagement of the torque-transmitting mechanisms 552, 554, and 558. This combination of engagements; namely 554 and 558, effectively holds the ring gear member 544 stationary as a reaction member. The sun gear member 542 and therefore output shaft 19 are driven at a speed determined by the speed of the planet carrier assembly member 546 and the ring gear/sun gear tooth ratio of the planetary gearset 540. The numerical value of the sixth forward speed ratio is determined by the ring gear/sun gear tooth ratio of the planetary gearset 540.

The truth table of FIG. 12 provides an example of numerical values for the reverse speed ratio and the six forward speed ratios. These numerical values are determined utilizing the ring gear/sun gear tooth ratios R1/S1, R2/S2, and R3/S3, which represent the ring gear/sun gear tooth ratios of the planetary gearsets 520, 530, and 540, respectively. Also shown in FIG. 12 is the chart of ratio steps between adjacent forward speed ratios and between the reverse and first forward speed ratio. Those skilled in the art will recognize that each of the forward single step and double step ratio interchanges are of the single transition variety which simplify the shift controls as is well known in the art.

Figures 13, 14:
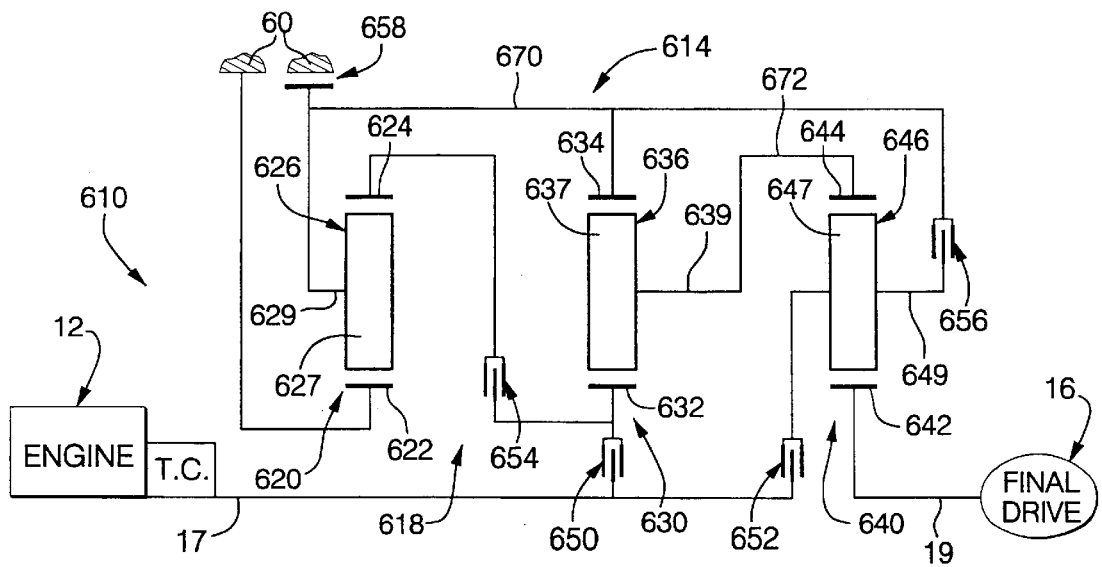
FIG. 13 is a schematic representation of a powertrain including another family member incorporating the present invention.
FIG. 14 is a truth table and chart describing some of the operating characteristics of the family member shown in FIG. 13.

A powertrain 610, shown in FIG. 13, includes the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, and four rotating type torque-transmitting mechanisms 650, 652, 654, and 656, and one stationary type torque-transmitting mechanism 658.

The planetary gearset 620 includes a sun gear member 622, a ring gear member 624, and a planet carrier assembly member 626. The planet carrier assembly member 626 includes a plurality of pinion gears 627 rotatably mounted on a planet carrier 629 and disposed in meshing relationship with both the sun gear member 622 and the ring gear member 624.

The planetary gearset 630 includes a sun gear member 632, a ring gear member 634, a planet carrier assembly member 636 which has a plurality of pinion gears 637 rotatably mounted on a planet carrier 639 and disposed in meshing relationship with the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier 649 and disposed in meshing relationship with both the sun gear member 642 and the ring gear member 644.

The planet carrier assembly member 626 is continuously connected with the ring gear member 634 through an interconnecting member 670. The planet carrier assembly member 636 is continuously connected with the ring gear member 644 through an interconnecting member 672. The sun gear member 622 is continuously connected with the transmission housing 60. The output shaft 19 is continuously connected with the sun gear member 642. The input shaft 17 is selectively connectible with the sun gear member 632 through the torque-transmitting mechanism 650, and selectively connectible with the planet carrier assembly member 646 through the torque-transmitting mechanism 652. The ring gear member 624 is selectively connectible with the sun gear member 634 through the torque-transmitting mechanism 654. The interconnecting member 670 is selectively connectible with the planet carrier assembly member 646 through the torque-transmitting mechanism 656, and selectively connectible with the transmission housing 60 through the torque-transmitting mechanism 658.

As with the family members shown above, the family member depicted in planetary gear arrangement 618 has one noncontinuously connected member in each of the planetary gearsets 620, 630, and 640. The ring gear member 624 is normally not continuously connected, the sun gear member 632 is noncontinuously connected, and the planet carrier assembly member 646 is noncontinuously connected.

The truth table shown in FIG. 14 describes the engagement sequence for the torque-transmitting mechanisms, as well as providing an example of numerical values for the ratio steps that might be attained in each of the forward speed ratios and the reverse speed ratio. As shown in the truth table, the torque-transmitting mechanisms are engaged in combinations of three and are engaged in such a manner such that the single step and double step forward ratio interchanges are of the single transition variety. The numerical values given in the truth table and in the chart that represent ratio steps are determined utilizing the ring gear/sun gear tooth ratios given as R1/S1, R2/S2, and R3/S3, which represent the ring gear/sun gear tooth ratios for the planetary gearsets 620, 630, and 640, respectively.

Those skilled in the art will recognize that the numerical value for the reverse speed ratio is determined utilizing the ring gear/sun gear tooth ratios of the planetary gearsets 630 and 640. The numerical values for the first, second, and fourth forward speed ratios are determined utilizing the ring gear/sun gear tooth ratios of all three planetary gearsets 620, 630, and 640. The third forward speed ratio is a direct drive having a numerical value of one. The fifth forward speed ratio has a numerical value determined utilizing the ring gear/sun gear tooth ratios of the planetary gearsets 630 and 640. The sixth forward speed ratio has a numerical value determined utilizing the ring gear/sun gear tooth ratio of the planetary gearset 640.

Figures 15, 16:
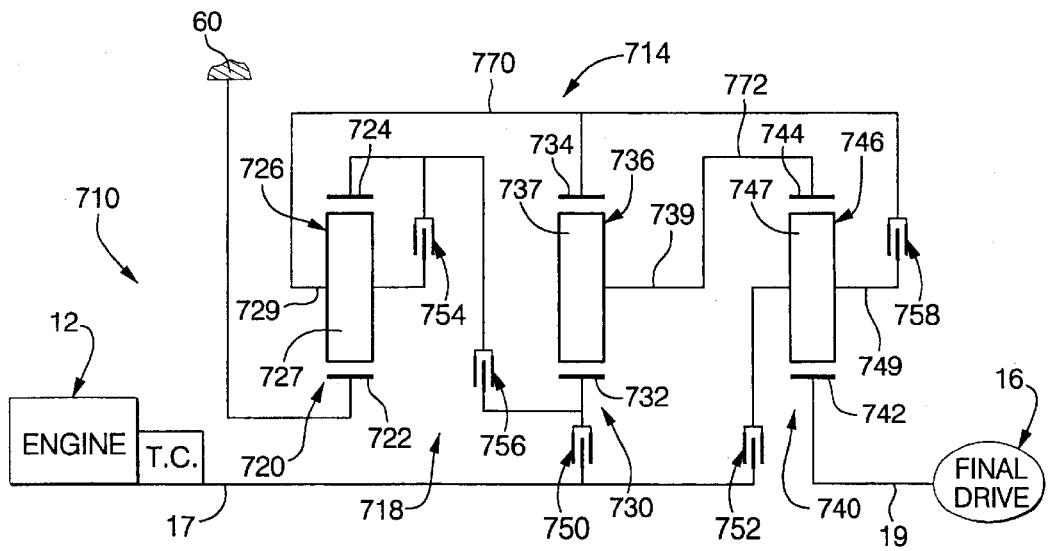
FIG. 15 is a schematic representation of a powertrain including another family member incorporating the present invention.
FIG. 16 is a truth table and chart describing some of the operating characteristics of the family member shown in FIG. 15.

A powertrain 710, shown in FIG. 15, includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and five rotating type torque-transmitting mechanisms 750, 752, 754, 756, and 758.

The planetary gearset 720 includes a sun gear member 722, a ring gear member 724, and a planet carrier assembly member 726. The planet carrier assembly member 726 includes a plurality of pinion gears 727 rotatably mounted on a planet carrier 729 and disposed in meshing relationship with both the sun gear member 722 and the ring gear member 724.

The planetary gearset 730 includes a sun gear member 732, a ring gear member 734, a planet carrier assembly member 736 which has a plurality of pinion gears 737 rotatably mounted on a planet carrier 739 and disposed in meshing relationship with the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier 749 and disposed in meshing relationship with both the sun gear member 742 and the ring gear member 744.

The planet carrier assembly member 726 is continuously connected with the ring gear member 734 through an interconnecting member 770. The planet carrier assembly member 736 and ring gear member 744 are continuously interconnected by an interconnecting member 772. The sun gear member 722 is continuously connected with the transmission housing 60. The sun gear member 742 is continuously connected with the output shaft 19. The input shaft 17 is selectively connectible with the sun gear member 732 through the torque-transmitting mechanism 750, and selectively connectible with the planet carrier assembly member 746 through the torque-transmitting mechanism 752. The ring gear member 724 is selectively connectible with the interconnecting member 770 through the torque-transmitting mechanism 754, and selectively connectible with the sun gear member 732 through the torque-transmitting mechanism 756. The interconnecting member 770 is selectively connectible with the planet carrier assembly member 746 through the torque-transmitting mechanism 758.

As seen in the truth table of FIG. 16, the torque-transmitting mechanisms are engaged in combinations of three to establish six forward speed ratios and one reverse speed ratio between the input shaft 17 and the output shaft 19 through the planetary gear arrangement 718. The truth table also provides an example of numerical values that might be attained in the planetary gear arrangement 718 when utilizing the ring gear/sun gear tooth ratios of the planetary gearsets 720, 730, and 740 as represented by the values R1/S1, R2/S2, and R3/S3, respectively. These numerical examples are also utilized in determining the ratio steps as shown in the chart of FIG. 16.

Those skilled in the art will recognize that the numerical value for the reverse speed ratio is determined utilizing the ring gear/sun gear tooth ratios of the planetary gearsets 730 and 740. The numerical values for the first, second, and fourth forward speed ratios are determined utilizing the ring gear/sun gear tooth ratios of all three planetary gearsets 720, 730, and 740. The third forward speed ratio is a direct drive having a numerical value of one. The fifth forward speed ratio has a numerical value determined utilizing the ring gear/sun gear tooth ratios of the planetary gearsets 730 and 740. The sixth forward speed ratio has a numerical value determined utilizing the ring gear/sun gear tooth ratio of the planetary gearset 740.

Figures 17, 18:
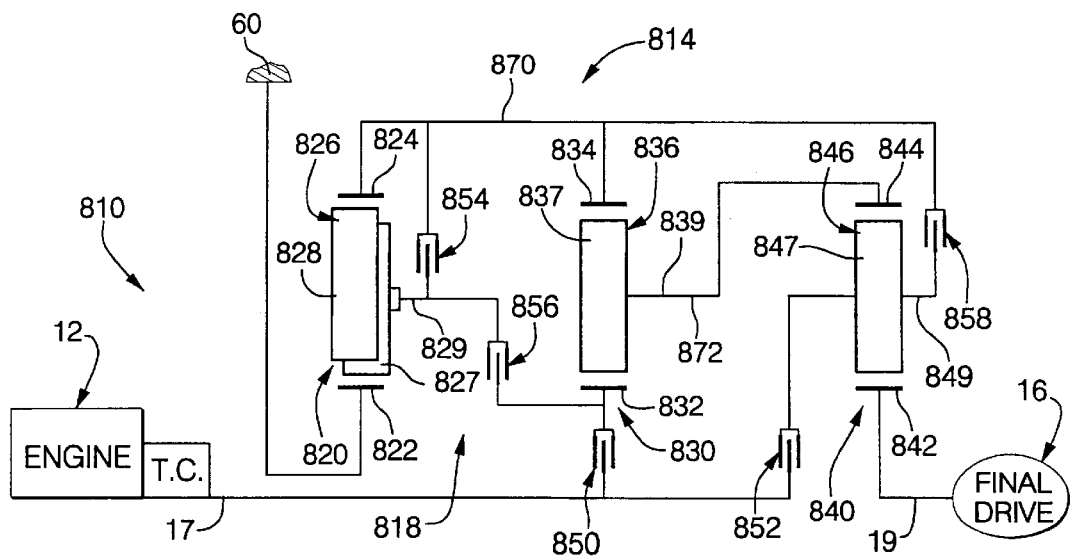
FIG. 17 is a schematic representation of a powertrain including another family member incorporating the present invention.
FIG. 18 is a truth table and chart describing some of the operating characteristics of the family member shown in FIG. 17.

A powertrain 810, shown in FIG. 17, includes the engine and torque converter 12, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840, and five rotating type torque-transmitting mechanisms 850, 852, 854, 856, and 858.

The planetary gearset 820 includes a sun gear member 822, a ring gear member 824, and a planet carrier assembly member 826. The planet carrier assembly member 826 includes a plurality of pairs of intermeshing pinion gears 827 and 828 which are rotatably disposed on a planet carrier 829 and meshingly engaged with the sun gear member 822 and the ring gear member 824, respectively.

The planetary gearset 830 includes a sun gear member 832, a ring gear member 834, a planet carrier assembly member 836 which has a plurality of pinion gears 837 rotatably mounted on a planet carrier 839 and disposed in meshing relationship with the sun gear member 832 and the ring gear member 834.

The planetary gearset 840 includes a sun gear member 842, a ring gear member 844, and a planet carrier assembly member 846. The planet carrier assembly member 846 includes a plurality of pinion gears 847 rotatably mounted on a planet carrier 849 and disposed in meshing relationship with both the sun gear member 842 and the ring gear member 844.

The ring gear member 824 and ring gear member 834 are continuously interconnected with an interconnecting member 870 which is selectively connectible with the planet carrier assembly member 826 through the torque-transmitting mechanism 854, and with the planet carrier assembly member 846 through the torque-transmitting mechanism 858. The input shaft 17 is selectively connectible with the sun gear member 832 through the torque-transmitting mechanism 850, and selectively connectible with the planet carrier assembly member 846 through the torque-transmitting mechanism 852. The sun gear member 822 is continuously connected with the transmission housing 60, and the output shaft 19 is continuously connected with the sun gear member 842. The planet carrier assembly member 826 is selectively connectible with the sun gear member 832 through the torque-transmitting mechanism 856. The planet carrier assembly member 826, the sun gear member 832, and planet carrier assembly member 846 are noncontinuously interconnected members of the planetary gear arrangement 818.

The truth table shown in FIG. 18 describes the engagement sequence and combinations for the torque-transmitting mechanisms in order to provide six forward speed ratios and one reverse speed ratio through the planetary gear arrangement 818 between the input shaft 17 and the output shaft 19. The truth table also provides an example of numerical values of speed ratios that are possible with the planetary gear arrangement 818 when the ring gear/sun gear tooth ratios of the planetary gearsets 820, 830, and 840 are equal to R1/S1, R2/S2, and R3/S3, respectively. These numerical values are also utilized in determining the ratio steps shown in the chart of FIG. 18.

Those skilled in the art will recognizet that the numerical value for the reverse speed ratio is determined by the ring gear/sun gear tooth ratios of the planetary gearsets 830 and 840. The numerical values of the first, second, and fourth forward speed ratios are determined utilizing the ring gear/sun gear tooth ratios of all three planetary gearsets 820, 830, and 840. The third forward speed ratio is a direct drive having a numerical value of one. The numerical value of the fifth forward speed ratio is determined by the ring gear/sun gear tooth ratios of the planetary gearsets 830 and 840. The numerical value of the sixth forward speed ratio is determined by the ring gear/sun gear tooth ratio of the planetary gearset 840.

Figures 19, 20:
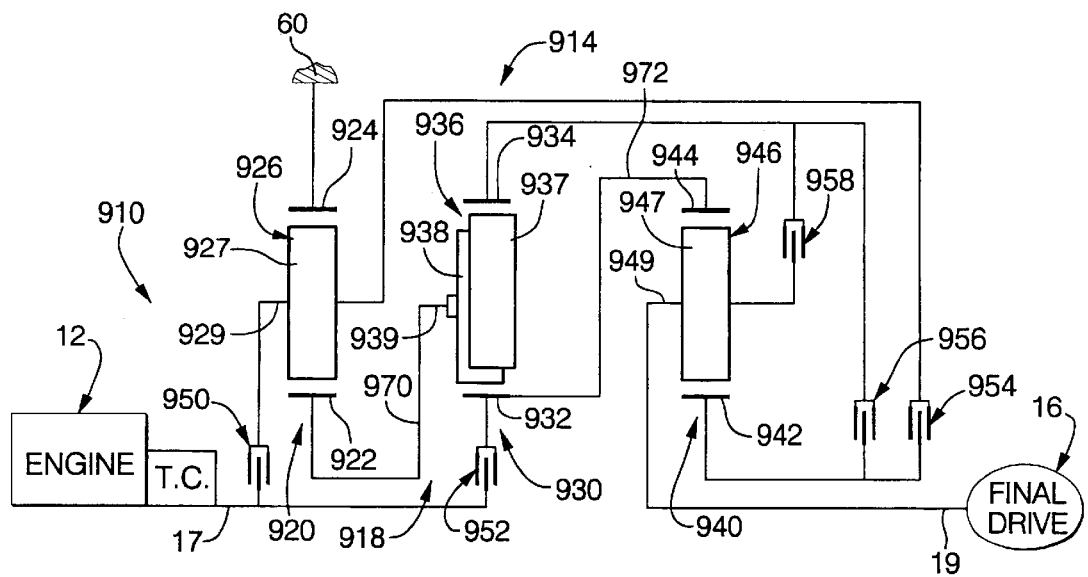
FIG. 19 is a schematic representation of a powertrain including another family member incorporating the present invention.
FIG. 20 is a truth table and chart describing some of the operating characteristics of the family member shown in FIG. 19.

A powertrain 910, shown in FIG. 19, includes the engine and torque converter 12, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940, and five rotating type torque-transmitting mechanisms 950, 952, 954, 956, and 958.

The planetary gearset 920 includes a sun gear member 922, a ring gear member 924, and a planet carrier assembly member 926. The planet carrier assembly member 926 includes a plurality of pinion gears 927 rotatably mounted on a planet carrier 929 and disposed in meshing relationship with both the sun gear member 922 and the ring gear member 924.

The planetary gearset 930 includes a sun gear member 932, a ring gear member 934, and a planet carrier assembly member 936. The planet carrier assembly member 936 includes a plurality of intermeshing pairs of pinion gears 937 and 938 that are rotatably mounted on a planet carrier 939 and disposed in meshing relationship with the sun gear member 932 and the ring gear member 934, respectively.

The planetary gearset 940 includes a sun gear member 942, a ring gear member 944, and a planet carrier assembly member 946. The planet carrier assembly member 946 includes a plurality of pinion gears 947 rotatably mounted on a planet carrier 949 and disposed in meshing relationship with both the sun gear member 942 and the ring gear member 944.

The sun gear member 922 and planet carrier assembly member 936 are continuously interconnected by an interconnecting member 970. The sun gear member 932 and ring gear member 944 are continuously interconnected by an interconnecting member 972. The ring gear member 924 is continuously connected with the transmission housing 60. The output shaft 19 is continuously connected with the planet carrier assembly member 946. The input shaft 17 is selectively connectible with the planet carrier assembly member 926 through the torque-transmitting mechanism 950, and selectively connectible with the interconnecting member 972 through the torque-transmitting mechanism 952. The sun gear member 942 is selectively connectible with the planet carrier assembly member 926 through the torque-transmitting mechanism 954, and selectively connectible with the ring gear member 934 through the torque-transmitting mechanism 956. The planet carrier assembly member 946 and therefore output shaft 19 are selectively connectible with the ring gear member 934 through the torque-transmitting mechanism 958.

As seen in the truth table of FIG. 20, the torque-transmitting mechanisms are engaged in combinations of three to establish a reverse speed ratio and seven forward speed ratios between the input shaft 17 and the output shaft 19 through the planetary gear arrangement 918. The truth table of FIG. 20 also describes the combination of engagements, as well as the sequence, to provide these speed ratios. It will be noted that each of the single step forward speed interchanges are of the single transition variety. The truth table also provides an example of numerical values that can be attained with the planetary gear arrangement 918 when the ring gear/sun gear tooth ratios of the planetary gearsets 920, 930, and 940 are equal to the ratios R1/S1, R2/S2, and R3/S3, respectively. Also given in FIG. 20 is a chart showing the ratio steps between adjacent forward speed ratios and between the reverse and first forward speed ratio when the example numerical ratios are utilized.

Those skilled in the art will recognize that the numerical values for the reverse speed ratio, the first forward speed ratio, the second forward speed ratio, the fourth forward speed ratio, and the seventh forward speed ratio are determined utilizing the ring gear/sun gear tooth ratios of all three planetary gearsets 920, 930, and 940. The third forward speed ratio has a numerical value of one. The fifth forward speed ratio has a numerical value determined utilizing the ring gear/sun gear tooth ratios of the planetary gearsets 920 and 930. The sixth forward speed ratio has a numerical value determined utilizing the ring gear/sun gear tooth ratio of the planetary gearset 920.

The planet carrier assembly member 926, the ring gear member 934, and the sun gear member 942 are each noncontinuously connected members of their respectively planetary gearsets.

Figures 21, 22:
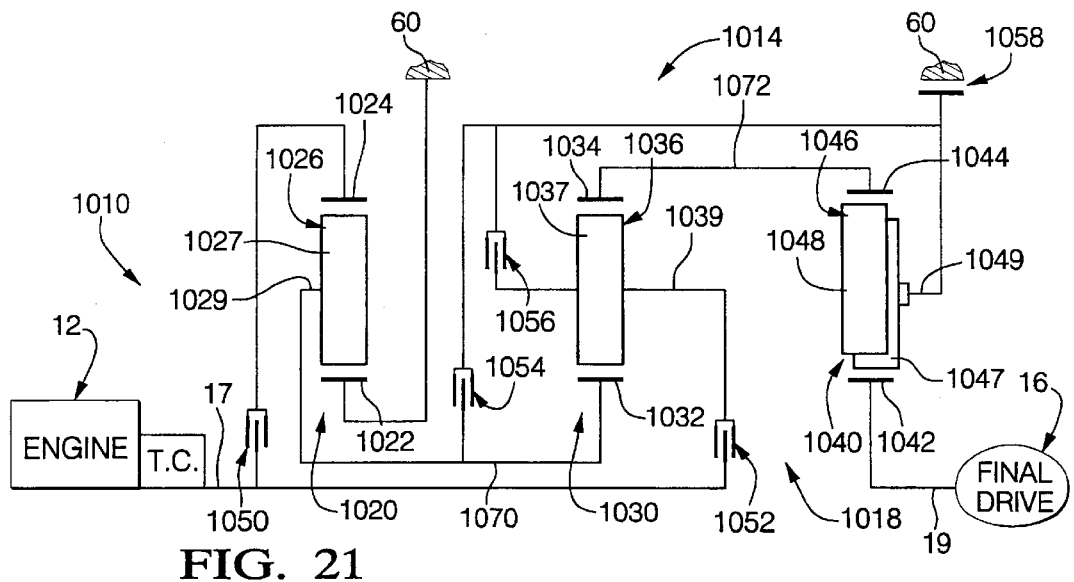
FIG. 21 is a schematic representation of a powertrain including another family member incorporating the present invention.
FIG. 22 is a truth table and chart describing some of the operating characteristics of the family member shown in FIG. 21.

A powertrain 1010, shown in FIG. 21, includes the engine and torque converter 12, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040, and four rotating type torque-transmitting mechanisms 1050, 1052, 1054, 1056, and one stationary type torque-transmitting mechanism 1058.

The planetary gearset 1020 includes a sun gear member 1022, a ring gear member 1024, and a planet carrier assembly member 1026. The planet carrier assembly member 1026 includes a plurality of pinion gears 1027 rotatably mounted on a planet carrier 1029 and disposed in meshing relationship with both the sun gear member 1022 and the ring gear member 1024.

The planetary gearset 1030 includes a sun gear member 1032, a ring gear member 1034, a planet carrier assembly member 1036 which has a plurality of pinion gears 1037 rotatably mounted on a planet carrier 1039 and disposed in meshing relationship with the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of intermeshing pinion gears 1047 and 1048, which are rotatably mounted on a planet carrier 1049 and disposed in meshing relationship with both the sun gear member 1042 and the ring gear member 1044, respectively.

The planet carrier assembly member 1026 and sun gear member 1032 are continuously interconnected with an interconnecting member 1070. The ring gear members 1034 and 1044 are continuously interconnected by an interconnecting member 1072. The sun gear member 1022 is continuously connected with the transmission housing 60. The sun gear member 1042 is continuously connected with the output shaft 19. The input shaft 17 is selectively connectible with the ring gear member 1024 through the torque-transmitting mechanism 1050, and selectively connectible with the planet carrier assembly member 1036 through the torque-transmitting mechanism 1052. The interconnecting member 1070 is selectively connectible with the planet carrier assembly member 1046 through the torque-transmitting mechanism 1054. The planet carrier assembly member 1046 is selectively connectible with the planet carrier assembly member 1036 through the torque-transmitting mechanism 1056, and selectively connectible with the transmission housing 60 through the torque-transmitting mechanism 1058.

As can be readily seen in FIG. 21, the ring gear member 1024, the planet carrier assembly member 1036, and the planet carrier assembly member 1046 are noncontinuously connected members in each of their respective planetary gearsets.

The truth table shown in FIG. 22 describes the combination of engagements, as well as the sequence of engagements, to attain six forward speed ratios and one reverse speed ratio through the planetary gear arrangement 1018 between the input shaft 17 and the output shaft 19. The truth table also provides an example of numerical values for these ratios which are attained utilizing the ring gear/sun gear tooth ratios of the planetary gearsets 1020, 1030, and 1040 as represented by the ratios R1/S1, R2/S2, and R3/S3, respectively. Also given in FIG. 22 is a chart of the numerical values for the ratio steps between adjacent forward speed ratios and between the reverse and first forward speed ratios. These ratio steps are, of course, determined from the numerical examples of speed ratios given in the truth table.

Those skilled in the art will recognize that the numerical values for the reverse speed ratio, the third forward speed ratio, the fourth forward speed ratio, and the fifth forward speed ratio, are all determined utilizing the ring gear/sun gear tooth ratios of all three planetary gearsets 1020, 1030, and 1040. The numerical value for the first forward speed ratio is determined utilizing the ring gear/sun gear tooth ratio of the planetary gearset 1020. The second forward speed ratio is a direct drive having a numerical value of one. The numerical value of the sixth forward speed ratio is determined utilizing the ring gear/sun gear tooth ratios of the planetary gearsets 1030 and 1040.

All of the family members have in common a member of the first planetary gearset connected continuously with the transmission housing; a member of the first planetary gearset and a member of the second planetary gearset continuously interconnected; another member of the second planetary gearset and a member of the third planetary gearset continuously interconnected; and the output shaft continuously connected with a member of one of the planetary gearsets. Further, each family member has an input shaft that is selectively connectible with at least two of the planetary gearsets through selectively engageable torque-transmitting mechanisms. Also, each of the family members has at least three noncontinuously interconnected members. Further, each family member has five torque-transmitting mechanisms that are engaged in combinations of three to establish a reverse speed ratio and at least six forward speed ratios between the input shaft and the output shaft through the planetary gear arrangement of each family member.

What is claimed is:

1. A multi speed transmission comprising:

an input shaft for delivering power to the transmission;

an output shaft for delivering power from said transmission;

a stationary housing;

a planetary gear arrangement having first, second, and third planetary gearsets each having first, second, and third members;

a first interconnecting member continuously interconnecting said first member of said first planetary gear set with said first member of said second planetary gear set;

a second interconnecting member continuously interconnecting said second member of said second planetary gear set with said first member of said third planetary gear set;

said second member of said first planetary gear set being continuously interconnected with said stationary housing;

said output shaft being continuously interconnected with said second member of said third planetary gearset;

five torque transmitting mechanisms wherein:

a first of said torque transmitting mechanisms selectively interconnecting said input shaft with said third member of said first planetary gearset and wherein either;

a second of said torque transmitting mechanisms selectively interconnecting said input shaft with said second interconnecting member, a third of said torque-transmitting mechanisms selectively interconnecting said third member of said first planetary gearset with said third member of said third planetary gearset, a fourth of said torque-transmitting mechanisms selectively interconnecting said third member of said second planetary gearset with said third member of said third planetary gearset, and a fifth of said torque-transmitting mechanisms selectively interconnecting said output shaft with said third member of said second planetary gearset, or said second torque-transmitting mechanism selectively interconnecting said input shaft with said 2-3, said third torque-transmitting mechanism selectively interconnecting said third member of said first planetary gearset with said third member of said third planetary gearset, said fourth torque-transmitting mechanism selective interconnecting said first interconnecting member with said third member of said third planetary gearset, and said fifth torque-transmitting mechanism selectively interconnecting said second interconnecting member with said third member of said third planetary gearset, or said second torque-transmitting mechanism selectively interconnecting said input shaft with said third member of said second planetary gearset, said third torque-transmitting mechanism selectively interconnecting said third member of said first planetary gearset with said third member of said third planetary gearset, said fourth torque-transmitting mechanism selectively interconnecting said first interconnecting member with said third member of said third planetary gearset, and said fifth torque-transmitting mechanism selectively interconnecting said output shaft with said third member of said third planetary gearset, or said second torque-transmitting mechanism selectively interconnecting said input shaft with said third member of said third planetary gearset, said third torque-transmitting mechanism selectively interconnecting said second interconnecting member with said third member of said first planetary gearset, said fourth torque-transmitting mechanism selectively interconnecting said third member of said first planetary gearset with said third member of said second planetary gearset, and said fifth torque-transmitting mechanism selectively interconnecting said output shaft with said third member of said second planetary gearset, or said second torque-transmitting mechanism selectively interconnecting said input shaft with said second interconnecting member, said third torque-transmitting mechanism selectively interconnecting said third member of said first planetary gearset with said third member of said third planetary gearset, said fourth torque-transmitting mechanism selectively interconnecting said third member of said second planetary gearset with said third member of said third planetary gearset, and said fifth torque-transmitting mechanism selectively interconnecting said output shaft with said third member of said second planetary gearset, or said second torque-transmitting mechanism selectively interconnecting said input shaft with said third member of said second planetary gearset, said third torque-transmitting mechanism selectively interconnecting said first interconnecting member with said third member of said third planetary gearset, said fourth torque-transmitting mechanism selectively interconnecting said third member of said second planetary gearset with said third member of said third planetary gearset, and said fifth torque-transmitting mechanism selectively interconnecting said stationary housing; and said torque transmitting mechanisms being engaged in combinations of three to establish at least six forward speed ratios and one reverse ratio between said input shaft and said output shaft.

2. The multi-speed transmission defined in claim 1 further comprising:

said first member, said second member, and said third member of each of said first, second, and third planetary gear sets being one of a sun gear member, a ring gear member, and a planet carrier assembly member.

3. The multi-speed transmission defined in claim 2 further comprising:

each said planet carrier assembly member being one of a single pinion type or a double pinion type.

4. The multi-speed transmissions defined in claim 1 further comprising:

each of said first, second, and third planetary gear sets being one of a simple planetary gear set or a compound planetary gear set.

5. A multi-speed transmission comprising:

an input shaft;

an output shaft;

a transmission housing;

a planetary gear arrangement having first, second, and third planetary gear sets, each planetary gear set having a first member, a second member, and a third member, a first interconnecting member continuously interconnecting said first members of said first and second planetary gear sets, a second interconnecting member continuously interconnecting said second member of said second planetary gear set with said first member of said third planetary gear set, said second member of said first planetary gear set being continuously interconnected with said transmission housing, and said second member of said third planetary gear set being continuously interconnected with said output shaft;

five selectively engageable torque transmitting mechanisms with either:

a first of said torque-transmitting mechanisms selectively interconnecting said input shaft with said third member of said first planetary gearset a second of said torque-transmitting mechanism selectively interconnecting said input shaft with said second interconnecting member, a third of said torque transmitting mechanisms selectively interconnecting said third member of said first planetary gearset with said third member of said third planetary gearset, a fourth of said torque transmitting mechanisms selectively interconnecting said third member of said second planetary gearset with said third member of said third planetary gearset, and a fifth of said torque transmitting mechanisms selectively interconnecting said output shaft with said third member of said second planetary gearset, or said first torque-transmitting mechanism selectively interconnecting said input shaft with said third member of said first planetary gearset, said second torque-transmitting mechanism selectively interconnecting said input shaft with said third member of said second planetary gearset, said third torque-transmitting mechanism selectively interconnecting said third member of said first planetary gearset with said third member of said third planetary gearset, said fourth torque-transmitting mechanism selectively interconnecting said first interconnecting member with said third member of said third planetary gearset, and said fifth torque-transmitting mechanism selectively interconnecting said second interconnecting member with said third member of said third planetary gearset, or said first torque-transmitting mechanism selectively interconnecting said input shaft with said third member of said first planetary gearset, said second torque-transmitting mechanism selectively interconnecting said input shaft with said third member of said second planetary gearset, said third torque-transmitting mechanism selectively interconnecting said third member of said first planetary gearset with said third member of said third planetary gearset, said fourth torque-transmitting mechanism selectively interconnecting said first interconnecting member with said third member of said third planetary gearset, and said fifth torque-transmitting mechanism selectively interconnecting said output shaft with said third member of said third planetary gearset, or said first torque-transmitting mechanism selectively interconnecting said input shaft with said third member of said first planetary gearset, said second torque-transmitting mechanism selectively interconnecting said input shaft with said third member of said third planetary gearset, said third torque-transmitting mechanism selectively interconnecting said second interconnecting member with said third member of said first planetary gearset, said fourth torque-transmitting mechanism selectively interconnecting said third member of said first planetary gearset with said third member of said second planetary gearset, and said fifth torque-transmitting mechanism selectively interconnecting said output shaft with said third member of said second planetary gearset, or said first torque-transmitting mechanism selectively interconnecting said input shaft with said first interconnecting member, said second torque-transmitting mechanism selectively interconnecting said input shaft with said third member of said third planetary gearset, said third torque-transmitting mechanism selectively interconnecting said second interconnecting member with said third member of said first planetary gearset, said fourth torque-transmitting mechanism selectively interconnecting said third member of said second planetary gearset with said third member of said third planetary gearset, and said fifth torque-transmitting mechanism selectively interconnecting said stationary housing with said third member of said second planetary gearset, or said first torque-transmitting mechanism selectively interconnecting said input shaft with said first interconnecting member, said second torque-transmitting mechanism selectively interconnecting said input shaft with said third member of said third planetary gearset, said third torque-transmitting mechanism selectively interconnecting said third member of said first planetary gearset with said third member of said third planetary gearset, said fourth torque-transmitting mechanism selectively interconnecting said third member of said second planetary gearset with said third member of said second planetary gearset, and said fifth torque-transmitting mechanism selectively interconnecting said stationary housing with said third member of said second planetary gearset, or said first torque-transmitting mechanism selectively interconnecting said input shaft with said third member of said second planetary gearset, said second torque-transmitting mechanism selectively interconnecting said input shaft with said third member of said third planetary gearset, said third torque-transmitting mechanism selectively interconnecting said third member of said first planetary gearset with said third member of said second planetary gearset, said fourth torque-transmitting mechanism selectively interconnecting said first interconnecting member with said third member of said third planetary gearset, and said fifth torque-transmitting mechanism selectively interconnecting said stationary housing with said first interconnecting member, or said first torque-transmitting mechanism selectively interconnecting said input shaft with said third member of said second planetary gearset, said second torque-transmitting mechanism selectively interconnecting said input shaft with said third member of said third planetary gearset, said third torque-transmitting mechanism selectively interconnecting said first interconnecting member with said third member of said first planetary gearset, said fourth torque-transmitting mechanism selectively interconnecting said third member of said first planetary gearset with said third member of said second planetary gearset, and said fifth torque-transmitting mechanism selectively interconnecting said first interconnecting member with said third member of said third planetary gearset, or said first torque-transmitting mechanism selectively interconnecting said input shaft with said third member of said first planetary gearset, said second torque-transmitting mechanism selectively interconnecting said input shaft with said second interconnecting member, said third torque-transmitting mechanism selectively interconnecting said third member of said first planetary gearset with said third member of said third planetary gearset, said fourth torque-transmitting mechanism selectively interconnecting said third member of said second planetary gearset with said third member of said third planetary gearset, and said fifth torque-transmitting mechanism selectively interconnecting said output shaft with said third member of said second planetary gearset, or said first torque-transmitting mechanism selectively interconnecting said input shaft with said third member of said first planetary gearset, said second torque-transmitting mechanism selectively interconnecting said input shaft with said third member of said second planetary gearset, said third torque-transmitting mechanism selectively interconnecting said first interconnecting member with said third member of said third planetary gearset, said fourth torque-transmitting mechanism selectively interconnecting said third member of said second planetary gearset with said third member of said third planetary gearset, and said fifth torque-transmitting mechanism selectively interconnecting said stationary housing; and said selectively engageable torque transmitting mechanisms being engaged in combinations of three to establish at least six forward speed ratios and one reverse speed ratio in said planetary gear arrangement between said input shaft and said output shaft.

6. The multi-speed transmissions defined in claim 5 further wherein:

single step speed ratio interchanges between adjacent forward speed ratios are accomplished as single transition interchanges.

7. The family of multi-speed transmissions defined in claim 5 further wherein:

double step speed ratio interchanges between said forward speed ratios are accomplished as single transition interchanges.

8. The multi-speed transmissions defined in claim 5 further wherein:

at least one of said first and second torque transmitting mechanisms is engaged during each of said forward speed ratios and said reverse speed ratio.

9. A multi-speed transmission comprising:

an input shaft;

an output shaft;

a transmission housing;

a planetary gear arrangement having first, second, and third planetary gear sets, each planetary gear set having a first member, a second member, and a third member, a first interconnecting member continuously interconnecting said first members of said first and second planetary gear sets, a second interconnecting member continuously interconnecting said second member of said second planetary gear set with said first member of said third planetary gear set, said second member of said first planetary gear set being continuously interconnected with said transmission housing, and said output shaft being continuously interconnected with at least one member of said planetary gear sets, said input shaft not being continuously interconnected with any member of the planetary gear sets, at least two of said planetary gear sets having a non-continuously interconnected member;

five selectively engageable torque transmitting mechanisms selectively interconnecting members of said first, second and third planetary gear sets with said input shaft, said transmission housing, said output shaft, or other members of said first, second and third planetary gear sets; and said selectively engageable torque transmitting mechanisms being engaged in combinations of three to establish at least six forward speed ratios and one reverse speed ratio in said planetary gear arrangement between said input shaft and output shaft.

\* \* \* \* \*